(12) United States Patent
Siddiqui et al.

(10) Patent No.: US 10,838,452 B2
(45) Date of Patent: Nov. 17, 2020

(54) COMPUTING DEVICE DISPLAY BONDING

(71) Applicant: Microsoft Technology Licensing, LLC, Redmond, WA (US)

(72) Inventors: Kabir Siddiqui, Sammamish, WA (US); Timothy M. Sullivan, Kirkland, WA (US); Rajesh M. Dighde, Redmond, WA (US); Linghui Rao, Redmond, WA (US); Camilo Leon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 16/255,749

(22) Filed: Jan. 23, 2019

(65) Prior Publication Data

US 2019/0243412 A1 Aug. 8, 2019

Related U.S. Application Data

(60) Provisional application No. 62/627,669, filed on Feb. 7, 2018.

(51) Int. Cl.
| | |
|---|---|
| *G06F 1/16* | (2006.01) |
| *B32B 7/12* | (2006.01) |
| *G02F 1/1333* | (2006.01) |
| *H04M 1/02* | (2006.01) |

(52) U.S. Cl.
CPC .............. *G06F 1/1601* (2013.01); *B32B 7/12* (2013.01); *G02F 1/133308* (2013.01); *G06F 1/1637* (2013.01); *H04M 1/0266* (2013.01); *B32B 2457/20* (2013.01); *G02F 2001/133317* (2013.01); *G02F 2001/133322* (2013.01); *G02F 2001/133325* (2013.01); *G02F 2201/46* (2013.01); *G02F 2201/465* (2013.01); *G02F 2202/28* (2013.01); *G06F 2200/1635* (2013.01)

(58) Field of Classification Search
CPC .... G06F 1/1601; G06F 1/1613; G06F 1/1616; G06F 1/1618; G06F 1/1637
See application file for complete search history.

(56) References Cited

U.S. PATENT DOCUMENTS

| | | | | |
|---|---|---|---|---|
| 7,304,837 | B2 * | 12/2007 | Lo .......................... | G06F 1/1601 248/313 |
| 7,697,273 | B2 * | 4/2010 | Kawano ............ | G02F 1/133308 248/917 |
| 7,864,261 | B2 * | 1/2011 | Chen .................... | G02B 6/0088 349/58 |

(Continued)

OTHER PUBLICATIONS

"International search Report and Written Opinion issued in PCT Application No. PCTIUS2019/016339", dated Apr. 24, 2019, 14 Pages.

*Primary Examiner* — Anthony Q Edwards
(74) *Attorney, Agent, or Firm* — Rainier Patents, P.S.

(57) ABSTRACT

The description relates to display devices. One example can include a display having an active area surrounded by an inactive deadband. The example can also include a chassis, the display received in the chassis and secured to the chassis beneath the inactive deadband with adhesive. The example can further include a fastening assembly positioned below the inactive deadband and farther beneath the plane than the adhesive, where the fastening assembly creates a retention force between the display and the chassis.

20 Claims, 14 Drawing Sheets

(56) References Cited

U.S. PATENT DOCUMENTS

| | | | | |
|---|---|---|---|---|
| 7,940,287 | B2* | 5/2011 | Kim, II | G02F 1/133308 |
| | | | | 349/60 |
| 10,599,188 | B1* | 3/2020 | McKittrick | G06F 1/1681 |
| 2001/0036057 | A1* | 11/2001 | Fukuyoshi | G06F 1/1616 |
| | | | | 361/679.26 |
| 2003/0197111 | A1* | 10/2003 | Morimoto | G06F 1/1616 |
| | | | | 248/694 |
| 2009/0247236 | A1* | 10/2009 | Kajiwara | H04M 1/0266 |
| | | | | 455/566 |
| 2010/0315769 | A1* | 12/2010 | Mathew | G06F 1/1637 |
| | | | | 361/679.29 |
| 2011/0285652 | A1* | 11/2011 | Imamura | G06F 1/1616 |
| | | | | 345/173 |
| 2012/0050958 | A1* | 3/2012 | Sanford | G06F 1/1626 |
| | | | | 361/679.01 |
| 2012/0281380 | A1 | 11/2012 | Werner et al. | |
| 2013/0343012 | A1* | 12/2013 | Park | H05K 7/1417 |
| | | | | 361/750 |
| 2014/0092532 | A1* | 4/2014 | Kole | H04M 1/0249 |
| | | | | 361/679.01 |
| 2015/0070826 | A1* | 3/2015 | Montevirgen | G06F 1/1637 |
| | | | | 361/679.26 |
| 2016/0227654 | A1* | 8/2016 | Kim | G06F 1/1637 |
| 2019/0297741 | A1* | 9/2019 | Pakula | H04M 1/0202 |

* cited by examiner

COMPUTING DEVICE DISPLAY BONDING

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

Many computing devices include displays. Traditionally, assembly of these computing devices has included securing a set of display components underneath a display protective layer. Overhanging portions of the display protective layer are secured to a chassis (e.g., display housing). These overhanging portions of the display protective layer do not contribute to an image area of the display and thus can be termed 'deadband' (e.g., inactive deadband, border). Traditionally, a large deadband was required to ensure the display was secured to the chassis. The present stacked securing concepts offer new techniques for securing the display to the device while offering reduced deadband (e.g., a higher percentage of active area relative to inactive deadband).

Figure 1:
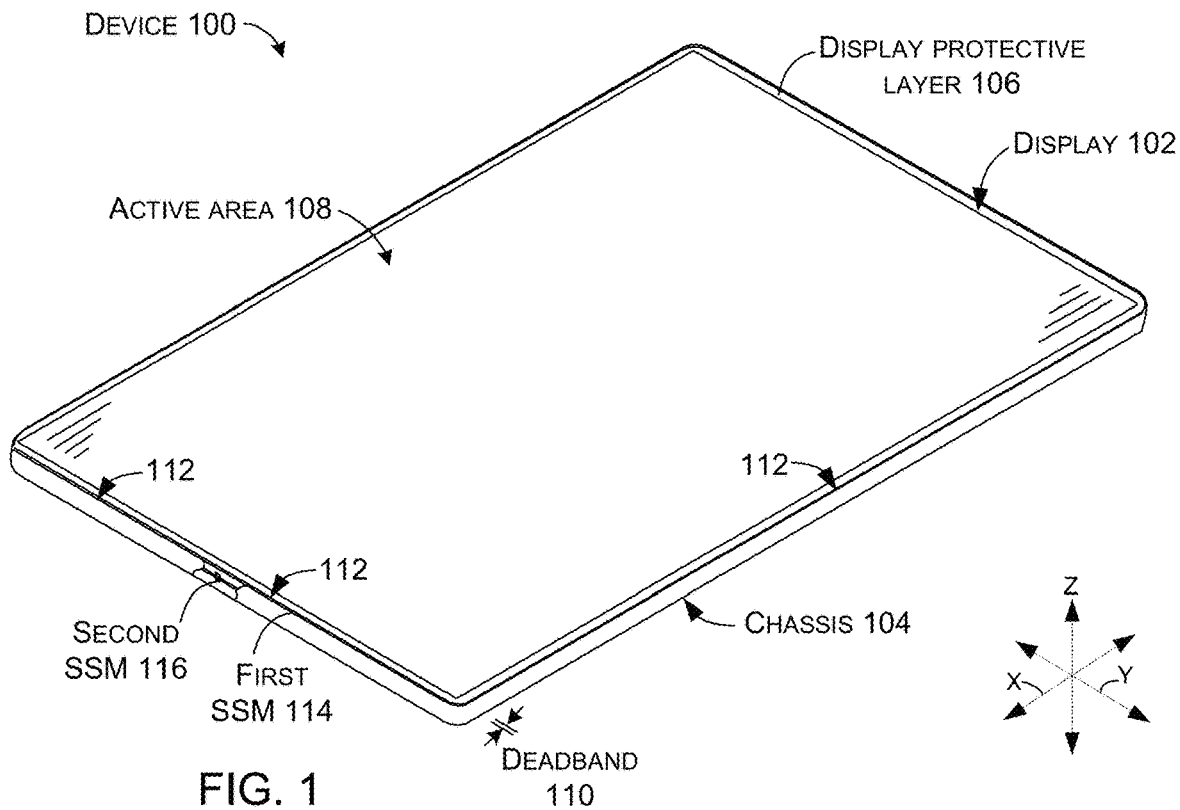
FIGS. 1, 2, and 4C are perspective views of example device implementations in accordance with the present stacked securing concepts.

FIG. 1 shows an example device 100 manifest as a tablet type computing device. The device 100 can include a display 102 extending along the xy-reference plane (e.g., horizontally) and positioned relative to a chassis 104 (e.g., system or display chassis). In this case, a top-most (e.g., exposed) layer of the display is manifest as a display protective layer 106. The display 102 can include an active area 108 (e.g., areas of the display which generate images). The active area 108 can be surrounded by deadband 110. The deadband 110 of the display can contribute mechanically to the device 100, but does not contribute to image generation and/or presentation, for example.

In the example illustrated in FIG. 1, the display 102 can be secured to the chassis 104 generally along a display-chassis interface generally indicated by multiple arrows 112. The display-chassis interface 112 can surround the display 102. The display can be secured to the chassis using one or more stacked securing mechanisms (SSM). In this case, a first stacked securing mechanism 114 can secure the display protective layer 106 to the chassis 104. A second stacked securing mechanism 116 (shown in cutaway) can secure the display to the chassis. The first and second stacked securing mechanisms can also extend along the display-chassis interface 112, or multiple first and second stacked securing mechanisms can be placed along the display-chassis interface. The second stacked securing mechanism 116 underlies (in the z-reference direction) the first stacked securing mechanism 114. Stated another way, the first and second stacked securing mechanisms can be stacked vertically (e.g., can be positioned below the deadband). In general, stacked securing implementations can achieve effective bonding between the display 102 and the chassis 104 with a narrower deadband 110 than is required when only bonding between the display protective layer and the chassis or housing is employed. Reducing deadband can improve the viewing experience for a user by contributing to a more 'side to side' and/or 'wall to wall' image on the display.

Figure 2:
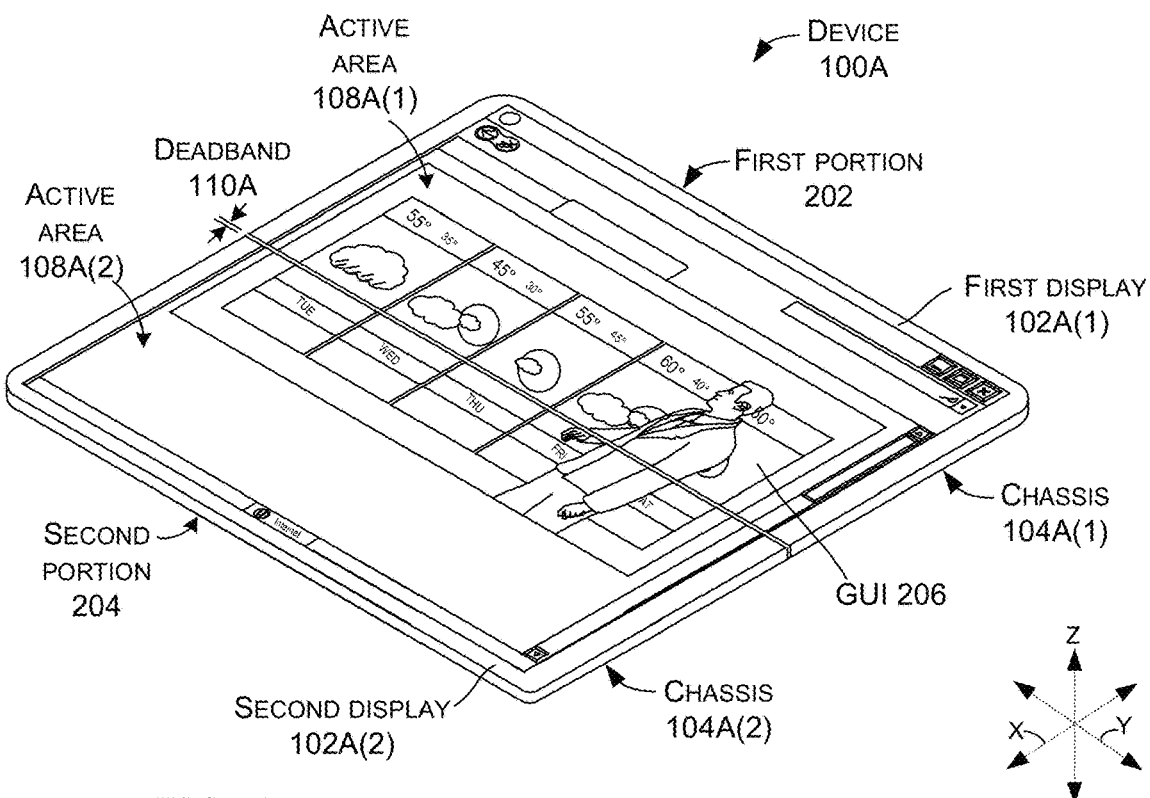

FIG. 2 shows another example device 100A that includes a first portion 202 that is rotatably secured to a second portion 204. First display 102A(1) is positioned on first portion 202 and second display 102A(2) is positioned on second portion 204, relative to chassis 104A. Device 100A can represent a foldable smart phone type computing device, for example. Stacked securing concepts can provide reduced deadband around a periphery of the device as mentioned relative to FIG. 1. As shown in FIG. 2, stacked securing concepts can also provide reduced deadband where the first and second displays 102A approach one another, as indicated at 110A. This reduced deadband between the displays can enhance the user experience when a single graphical user interface (GUI) 206 is presented across the active areas 108A(1) and 108A(2) of both displays 102A(1) and 102A(2).

Figure 3:
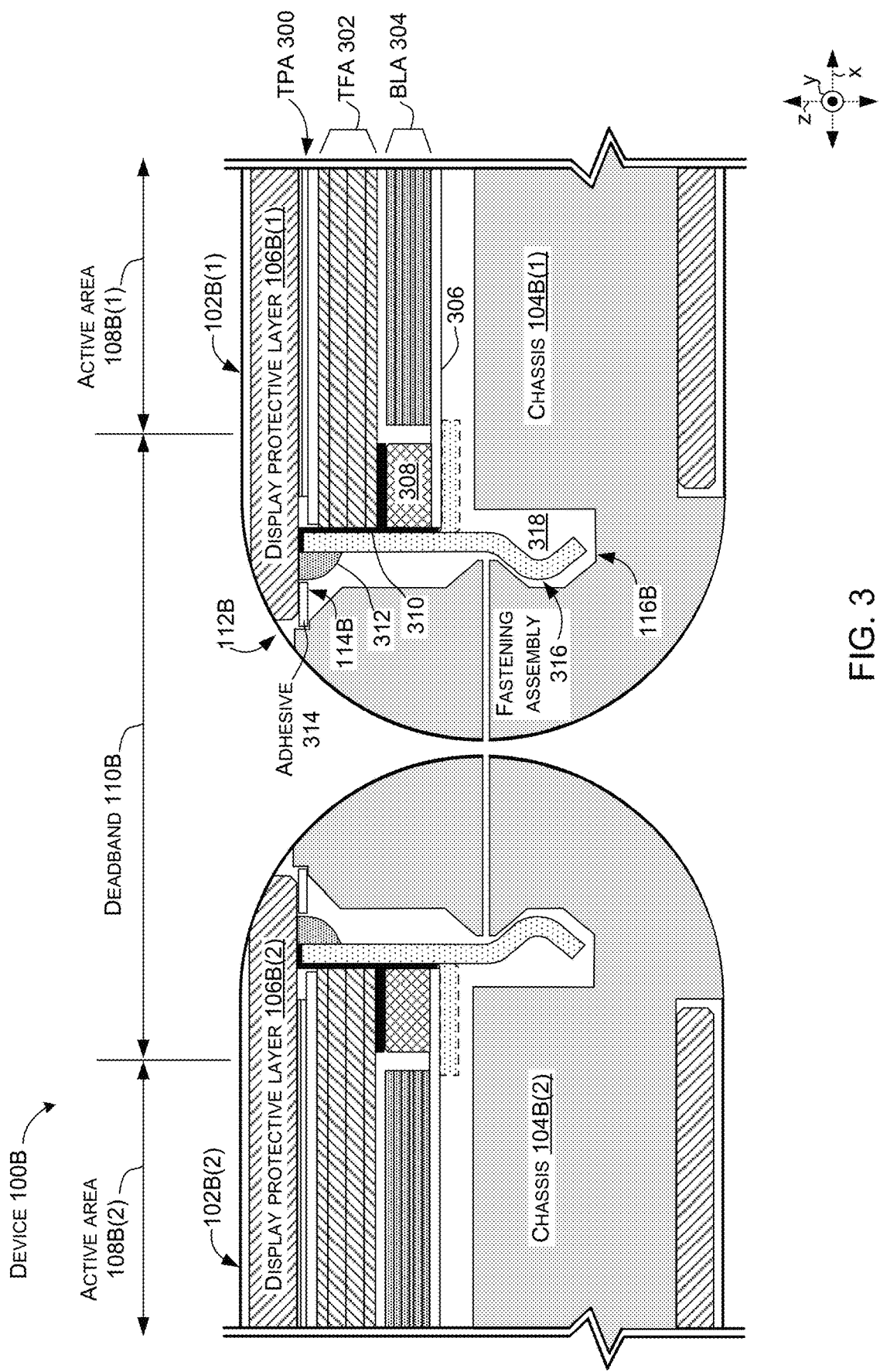
FIGS. 3-4B and 5A-14B are sectional views of example device implementations in accordance with the present stacked securing concepts.

FIG. 3 shows a sectional view of another device 100B that includes displays 102B(1) and 102B(2). (Note that due to space constraints only a portion of the sectional view is represented on the drawing page.) The displays 102B are embedded in chassis 104B(1) and 104B(2). The displays can be secured to the chassis with first and second stacked securing mechanisms 114B and 116B. The chassis 104B may be analogous to the chassis 104 and 104A of FIGS. 1 and 2 or the chassis may be positioned in another housing. For example, the chassis 104 and 104A indicated in FIGS. 1 and 2 may be a decorative housing positioned around another chassis similar to chassis 104B in FIG. 3.

In the example shown in FIG. 3, although the elements are similar between displays 102B(1) and 102B(2), some of the elements will only be labeled with respect to display 102B(1) to avoid clutter on the drawing page. Not all display components are designated with specificity. Generally, the display components can include a touch panel assembly (TPA) 300, a thin film assembly (TFA) 302, and/or a backlight assembly (BLA) 304. In some implementations, these assemblies can include, in descending order (starting underneath the display protective layer 106B), an adhesive film, an optically clear adhesive, a polarizer, a liquid-crystal display (LCD) color filter glass, liquid crystals, an LCD thin film transistor (TFT) glass, a polarizer, a light guide plate, a light-emitting diode (LED) partial reflector, an LED, an LED flex/housing, and/or a reflector sheet, among others. The display can also include a back plate 306, a mold frame 308, tape 310, and/or edge fill 312. The back plate 306 can be formed from metal or another suitable material. In some cases, the back plate can serve as a display chassis (e.g., bucket) for at least some of the display components, such as the backlight assembly 304. The mold frame 308 can be formed from plastic or another suitable material.

In this example, active areas 108B are generally designated as the areas above the backlight assemblies 304. The precise boundary (e.g., extent in the xy-reference plane) of the active area(s) of a display may differ in some descriptions and/or implementations. Regardless, in this example the deadband 110B includes an area that extends between the active areas 108B of the displays 102B.

In general, an area outside (beyond a width in the xy-reference plane) of the backlight assembly 304 can be utilized to run electrical traces and/or wiring. Traditionally, deadband of a device has included extra width of the device (beyond a backlight assembly width) needed for the electrical traces. Furthermore, the deadband has included additional extra width to ensure the display was secured to the chassis. Therefore, the deadband of a device typically accommodated the necessary electrical traces and also encompassed real estate for securing the display to the chassis. Using stacked securing concepts, the deadband can be narrower. For example, at least a portion of the mechanisms for securing the display to the chassis can be stacked vertically underneath the electrical traces, reducing the deadband.

Referring again to FIG. 3, first stacked securing mechanism 114B can secure the display protective layer 106B(1) to the chassis 104B(1) at the display-chassis interface 112B. In this case, the first stacked securing mechanism can be adhesive 314. For instance, pressure sensitive adhesives and/or double-sided tape can be employed. The particular shape and/or placement of first stacked securing mechanism 114B is not meant to be limiting.

Second stacked securing mechanism 116B can be positioned generally below the first stacked securing mechanism 114B to contribute to the securing of the display 102B(1) to the chassis 104B(1). In this case, the second stacked securing mechanism can be manifest as fastening assembly 316. Fastening assembly 316 is shown in FIG. 3 relative to a cavity 318 (e.g., open space) inside the chassis. Elements of example fastening assemblies as well as their functions will be described in more detail relative to FIGS. 4A through 13B, below. In general, elements of the fastening assembly can be integrated with and/or attached to the display 102B(1) and/or the chassis 104B(1), and engagement of the fastening assembly can secure the display to the chassis.

Note that the second stacked securing mechanism 116B is generally vertically arranged (in the z-reference direction) with respect to the first stacked securing mechanism 114B. For instance, both the first stacked securing mechanism 114B and the second stacked securing mechanism 116B can lie under the deadband 110B and also under the display protective layer 106B. The first and second stacked securing mechanisms do not need to be directly vertically aligned (in the z-reference direction) with each other to comply with stacked securing concepts.

Also, in the example shown in FIG. 3, the second stacked securing mechanism 116B is vertically elongate (in the z-reference direction), and/or relatively horizontally narrow (e.g., thin). This general vertical arrangement and/or vertical elongation of the stacked securing mechanisms accomplishes securing the displays 102B to the chassis 104B with reduced horizontal real estate (e.g., reduced deadband 110B and increased active areas 108B). Without this vertical arrangement, traditional techniques used a wide overhang of the display protective layer over the chassis to ensure sufficient area for bonding, thereby increasing the deadband. As an alternative to a wide overhang of the display protective layer 106B, stacked securing concepts can be applied in the deadband 110B to secure the display 102B to the chassis 104B with a smaller deadband than would be required when a traditional bonding technique is employed.

FIGS. 4A through 14B collectively show various example stacked securing mechanisms. In general, FIGS. designated with the suffix "A" are sectional views that include the display and the chassis of the respective example device, similar to the sectional view in FIG. 3 that shows displays 102B and chassis 104B of device 100B. In the FIGS. designated with the suffix "B," the chassis is removed from the sectional view so that additional detail relating to the stacked securing mechanism(s) and/or display may be designated while avoiding clutter on the drawing page. FIG. 4C is a perspective view of a portion of a fastening assembly, described below. Also, for FIGS. 4A through 14B, only a portion of each sectional view is represented due to space constraints.

Figure 4A:
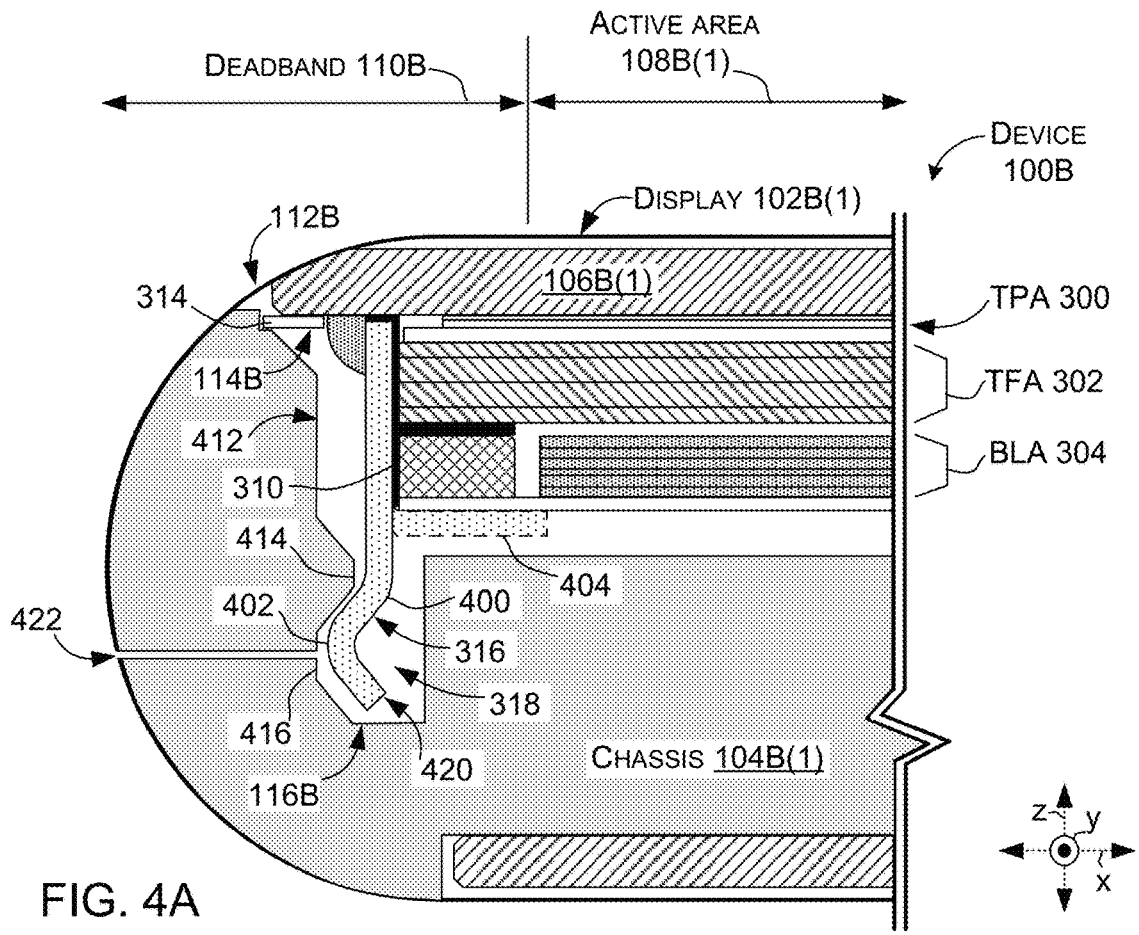
Figure 4B:
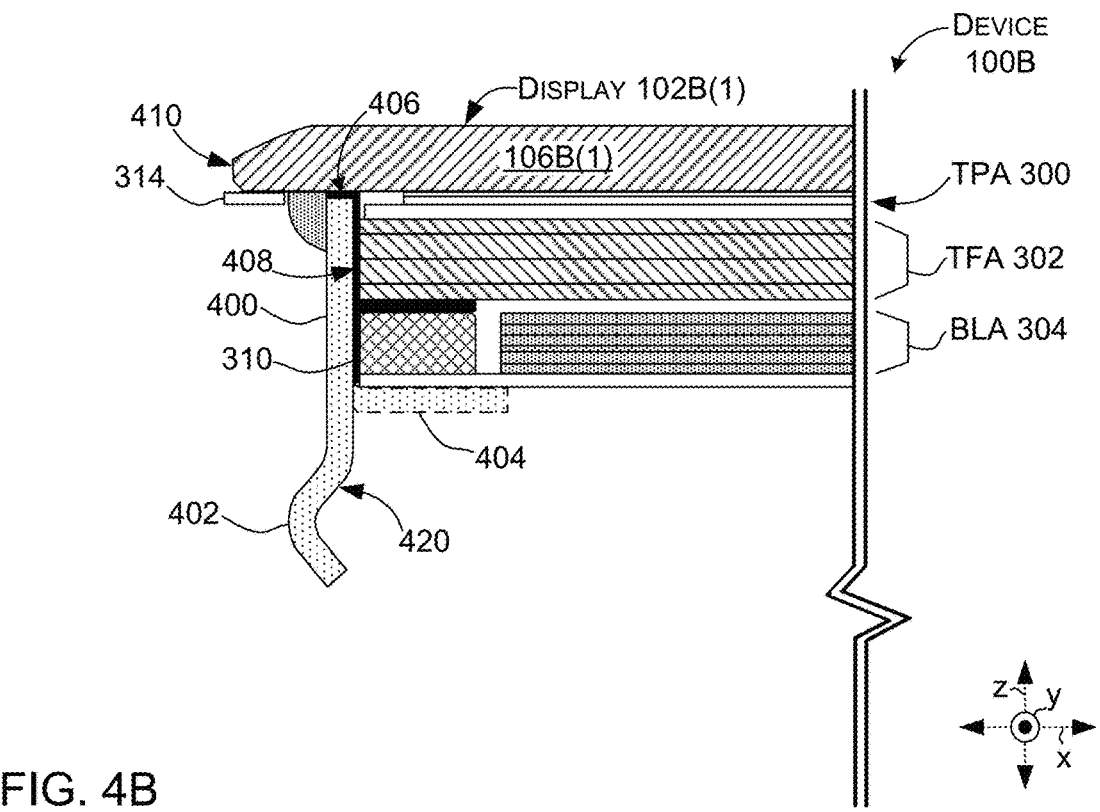
Figure 4C:
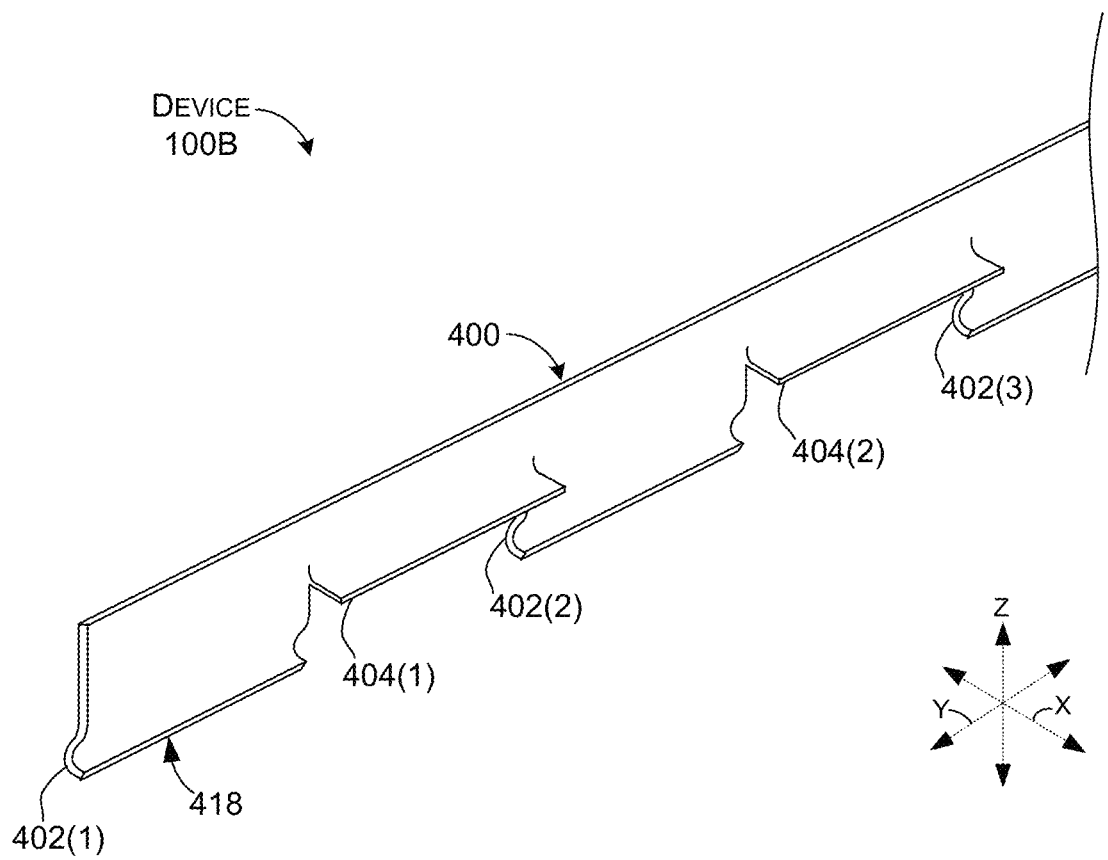

FIGS. 4A-4C collectively show additional views of device 100B relating to the fastening assembly 316. For sake of brevity, not all components of device 100B will be reintroduced with respect to FIGS. 4A and 4B. FIGS. 4A and 4B show the fastening assembly 316 of the second stacked securing mechanism 116B. In this implementation, the fastening assembly 316 can include a bracket 400. The bracket can define a dimple 402 and a tab 404. In this example, the bracket is generally vertically elongate (in the z-reference direction). For instance, the bracket extends from a lower surface (indicated at 406 in FIG. 4B) of the display protective layer 106B(1) downwardly into the cavity 318. The bracket 400 can be secured to the display 102B(1), such as with tape 310, at an outer edge (indicated at 408 in FIG. 4B) of the thin film assembly (TFA) 302 and to the lower surface 406 of the display protective layer 106B(1), for instance. In this example, the bracket 400 is set back (in the x-reference direction) from an outer edge (indicated at 410 in FIG. 4B) of the display protective layer 106B(1), which can provide an area on the lower surface 406 for the adhesive 314. In this case, some elements of the fastening assembly 316 can be included in the chassis 104B(1). For instance, an interior wall (indicated at 412 in FIG. 4A) of the chassis 104B(1) can define a protuberance 414 and a recess 416, which can be considered part of the fastening assembly 316.

FIG. 4C shows a perspective view of bracket 400. In this perspective view, multiple dimples 402 on the lower portions (indicated at 418) of the bracket are shown. Multiple tabs 404 are also shown, such that the bracket features alternating sections of dimples 402 and tabs 404. In FIGS. 4A and 4B, tab 404 is shown with dashed lines to indicate that it is not in the same xz-plane as other elements of FIGS. 4A and 4B. As shown in FIG. 4C, the tabs 404 can be formed as one or more horizontal extensions or 'flaps' on the bracket 400, such as by bending or molding a single piece of stamped metal. The dimples 402 can also be formed by bending the lower portions 418 of the bracket, for example. In other implementations, the tabs could be part of a separate piece or pieces, and can be welded to the bracket 400, for example.

Referring again to FIGS. 4A and 4B, the fastening assembly 316 can secure the display 102B(1) to the chassis 104B(1). In this case, the dimple 402 of the bracket 400 can engage the recess 416 of the chassis 104(B)1. For instance, the bracket 400 can be formed from spring materials, such as stainless steel and/or another suitable metal and/or other materials. During assembly, the display 102B(1) can be forced downward toward the chassis 104(B)1 until the dimple 402 passes downward beyond the protuberance 414 and into the cavity 318, and springs into the recess 416, creating a retention force (e.g., spring force, frictional force).

The fastening assembly 316 can also accommodate manufacturing tolerances of the display 102(B)1 and/or chassis 104(B)1 in the x-, y-, and/or z-reference directions. For instance, the dimples 402 biased against the recess 416 below protuberance 414 can provide sufficient retention forces to retain the display in the chassis as long as these components are within minimum/maximum specifications. Further, the nature of the fastening assembly can create a self-aligning configuration during assembly. For instance, once the bracket 400 is lowered into cavity 318, and the dimples are forced past the protuberances, the bias of the dimples against the protuberances 414 and recesses 416 can automatically create downward pressure (e.g., retention force) between the display protective layer 106B and the chassis 104B and/or can center the display 102B in the x- and y-reference directions. The retention force can retain the display in this position unless forces are imparted on the components to overcome the retention force to disassemble the components.

Stated another way, in the example shown in FIGS. 4A and 4B, the bracket 400 can be considered a biasing element (indicated at 420) of the device 100B. The biasing element 420 (e.g., spring) can create a retention force between the display 102B and the chassis 104B. The retention force can be overcome to disassemble the display from the chassis. For instance, chassis 104B can have an access port 422 (e.g., tunnel) into which a rod or pin (not shown) can be inserted. In this case, the rod can be pushed against dimple 402 to overcome the retention force, freeing bracket 400 to be pulled up and out of cavity 318. Stated yet another way, the display 102B can have a 'snap fit' relationship with the chassis 104B by way of the biasing element 420. In other implementations, the biasing element may be manifest as a different element of the device. The biasing element 420 may be part of the display, part of the chassis, or both the display and chassis may include a biasing element. Additional examples of biasing elements will be shown in the FIGS. and described below.

In some implementations, multiple second stacked securing mechanisms 116B, such as fastening assemblies 316, can be spaced along the perimeter of the display-chassis interface 112B. (Referring to FIGS. 4A-4C, each dimple 402 of the bracket 400 and recess 416 of chassis 104B(1) could correspond to an individual fastening assembly.) The first stacked securing mechanism 114B, such as adhesive 314, may be used along the display-chassis interface to complement the fastening assemblies (e.g., a film or bead of adhesive can be applied along the entirety of the display-chassis interface). In some implementations, the fastening assemblies can force or hold the components together while the adhesive is cured. Alternatively, the fastening assemblies 316 may provide sufficient retention of the display 102B(1) in the chassis 104B(1) while the first stacked securing mechanism 114B seals display-chassis interfaces 112B to prevent contaminants, such as dust from entering the device 100B.

As noted above, FIGS. 4A-14B are provided to show various examples of stacked securing mechanisms. The example device 100B shown in FIGS. 4A-4C includes a fastening assembly 316 with a bracket 400 secured to the display 102B, in which the bracket is the biasing element 420. The further examples shown in FIGS. 5A-14B are organized as follows. FIGS. 5A-9B show example devices that include a fastening assembly with a bracket secured to the display, in which the bracket is the biasing element, similar to the example shown in FIGS. 4A-4C. FIGS. 10A-11B show example devices that include a fastening assembly with a bracket secured to the display and a separate biasing element secured to the chassis. FIGS. 12A-13B show example devices that include a fastening assembly with a pin secured to the display and a separate biasing element secured to the chassis. FIGS. 14A and 14B show an example device in which the second stacked securing mechanism is adhesive, rather than a fastening assembly.

Although the example devices shown in FIGS. 4A-9B all include a fastening assembly with a bracket secured to the display, in which the bracket is the biasing element, these different example devices feature variations in geometry of the display, chassis, display-chassis interface, and/or stacked securing mechanisms. In general, even small differences in geometry can produce desirable reductions in deadband in accordance with stacked securing concepts. In some implementations, differences in geometry may complement or compete with other design advantages, such as ease and/or cost of manufacturing, ease of disassembly for maintenance or repair, and/or durability of the device. For reasons such as these, many variations in the design of the stacked securing mechanisms or other aspects of stacked securing concepts are considered. The examples shown in FIGS. 5A-9B are provided to show and describe at least some of the various potential design differences.

Figure 5A:
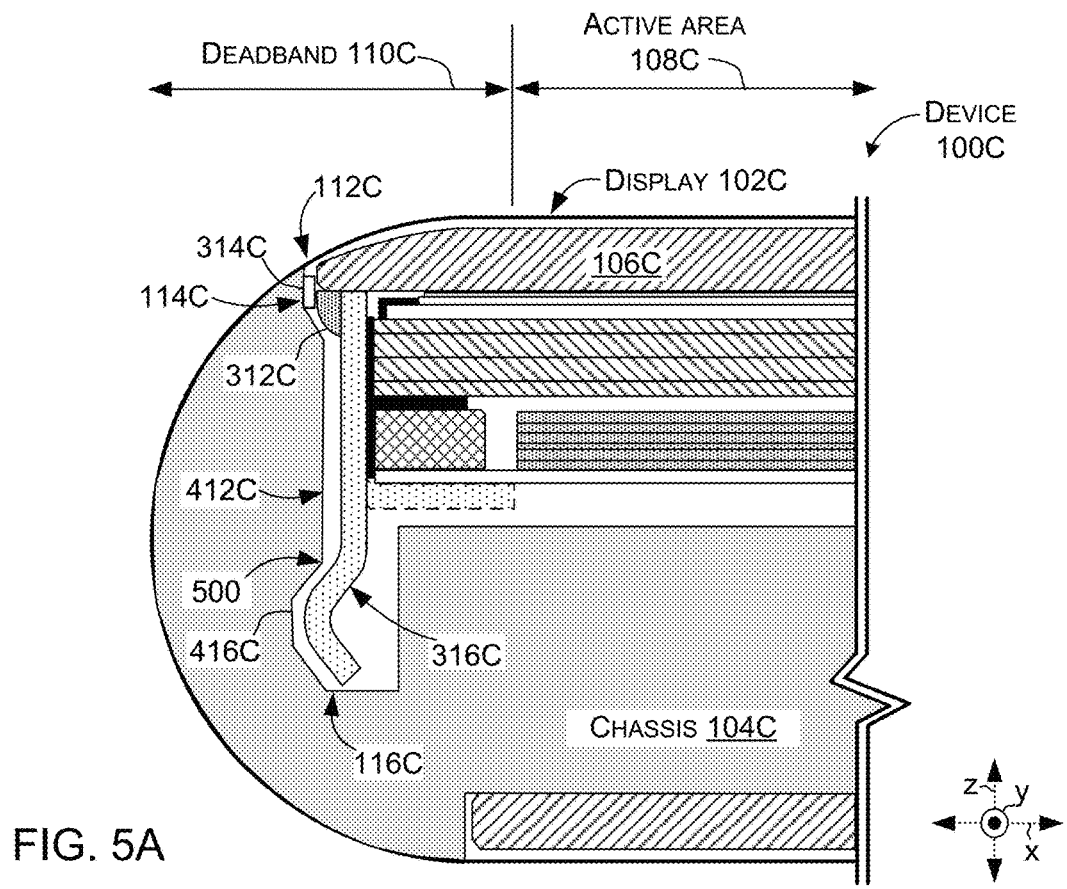
Figure 5B:
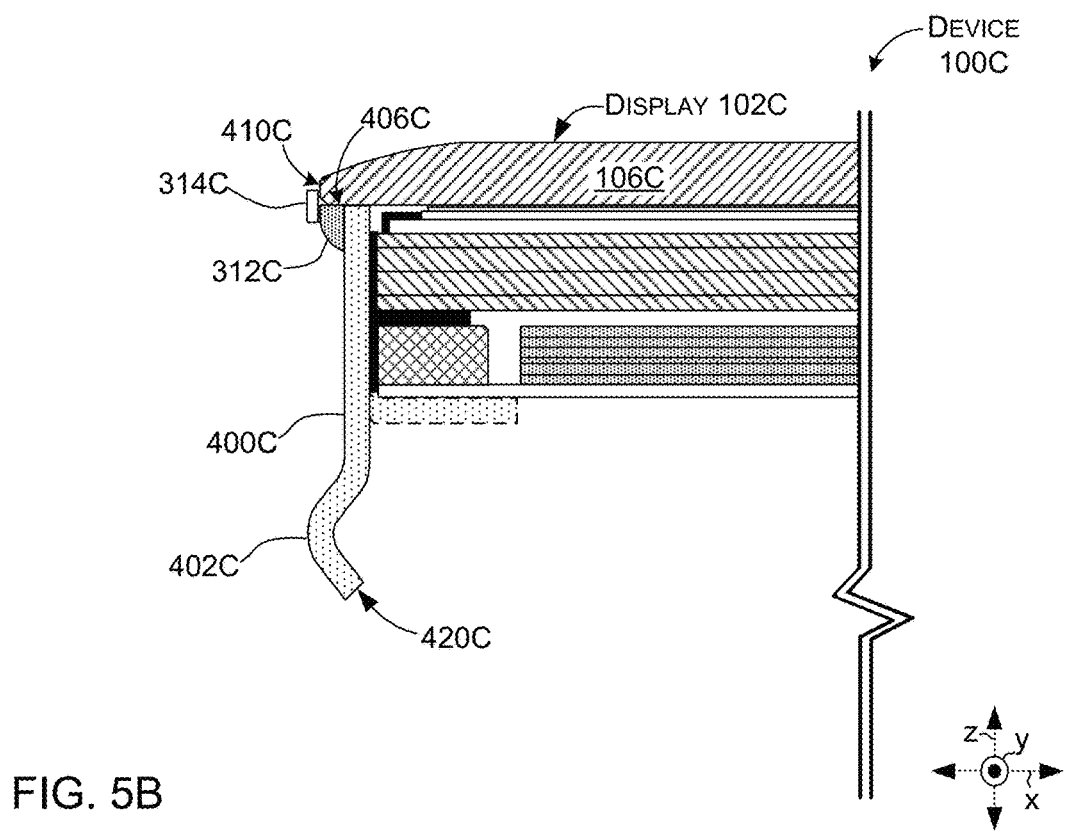

FIGS. 5A and 5B collectively show example device 100C, including display 102C, chassis 104C, and first and second stacked securing mechanisms 114C and 116C. In this case, second stacked securing mechanism 116C is manifest as fastening assembly 316C. The fastening assembly can include bracket 400C and recess 416C of the chassis. Bracket 400C can function as biasing element 420C which can bias dimple 402C into recess 416C.

Differences in geometry (e.g., shape) between device 100B (FIG. 4A) and device 100C (FIG. 5A) can include differences along the display-chassis interfaces 112B and 112C and/or differences in an overall shape of the chassis 104B and 104C, for example. In particular, in FIG. 5A, the interior wall 412C rises directly up from an upper edge (indicated at 500) of recess 416C, in contrast to the interior wall 412 of chassis 104B(1) shown in FIG. 4A. In the example shown in FIG. 5A, positioning of the fastening assembly 316C is relatively closer to the outer edge 410C of the display protective layer 106C than in the example shown in FIG. 4A. Also, the first and second stacked securing mechanisms 114C and 116C are generally more vertically aligned in the example in FIG. 5A than in the example shown in FIG. 4A. Accordingly, the example shown in FIG. 5A can potentially offer a narrower deadband 110C than the example shown in FIG. 4A.

As illustrated in FIGS. 5A and 5B, adhesive 314C can have a vertical orientation to correspond to a geometry of the display-chassis interface 112C. In this example, edge fill 312C is positioned proximate to the outer edge 410C of the display protective layer 106C, leaving no exposed area on the lower surface 406C of the display protective layer 106C on which the adhesive 314C could be placed. Accordingly, the adhesive 314C can be positioned vertically in the display-chassis interface 112C between an upper portion of the interior wall 412C of the chassis 104C, the outer edge 410C of the display protective layer, and the edge fill 312C. The vertical orientation of the adhesive 314C in this example can contribute to overall vertical alignment of the first and second stacked securing mechanisms 114C and 116C, helping to decrease deadband 110C. Other variations in the extent, orientation, or positioning of adhesive are contemplated.

Figure 6A:
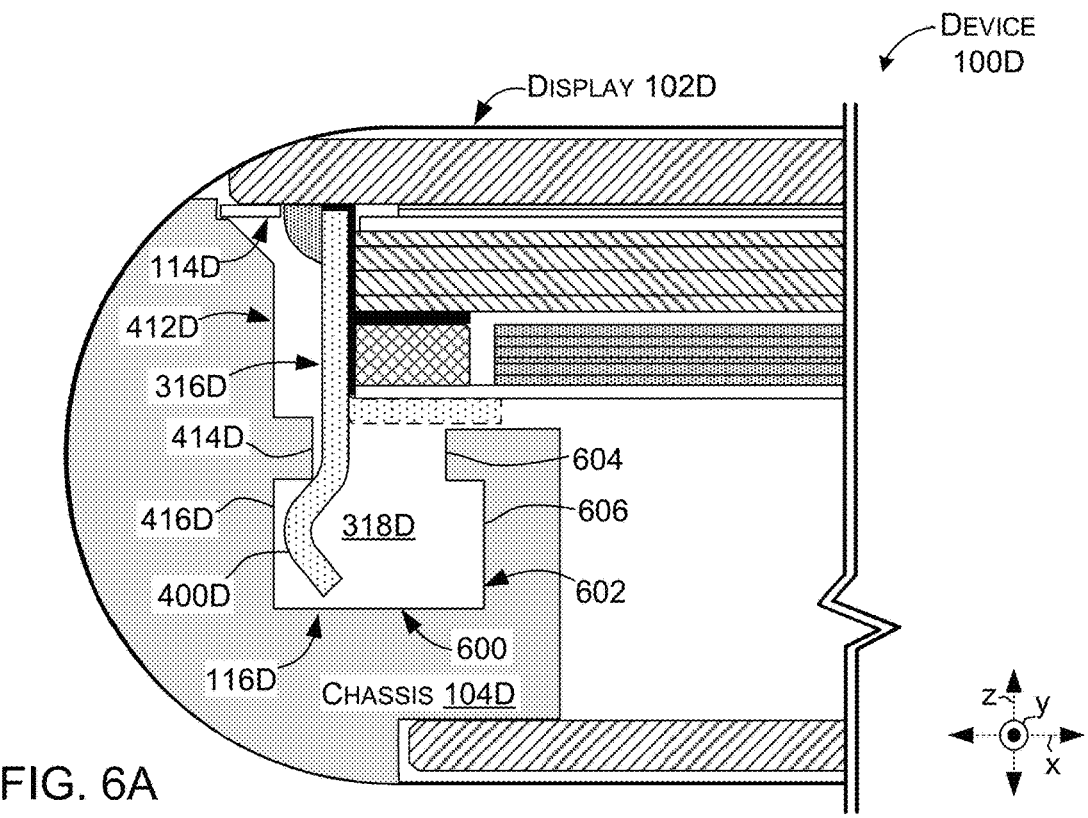
Figure 6B:
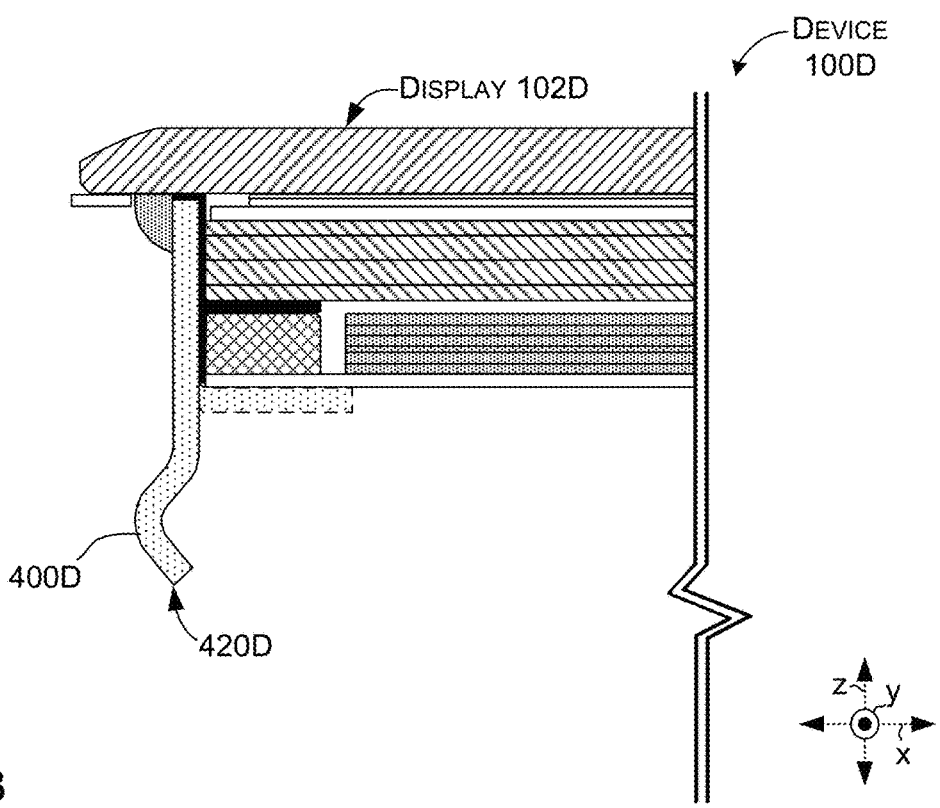

FIGS. 6A and 6B collectively show example device 100D, including display 102D, chassis 104D, and first and second stacked securing mechanisms 114D and 116D. Here again the bracket 400D is also the biasing element 420D. In this example, the bracket 400D of fastening assembly 316D has a similar shape and/or dimensions to the bracket 400 shown in FIG. 4A. However, as shown in FIG. 6A, the cavity 318D defined by the chassis 104D has a different shape than the cavity 318 in example chassis 104B(1) (FIG. 4A). As shown in FIG. 6A, the cavity 318D can be bounded by the interior wall 412D, a cavity floor indicated at 600, and another interior wall indicated at 602. In this example, the chassis defines another protuberance 604 on interior wall 602 opposite protuberance 414D, and another recess 606 opposite recess 416D. In some implementations, geometry differences of the cavity may correspond to decreased deadband, and/or other design advantages and/or purposes.

Figure 7A:
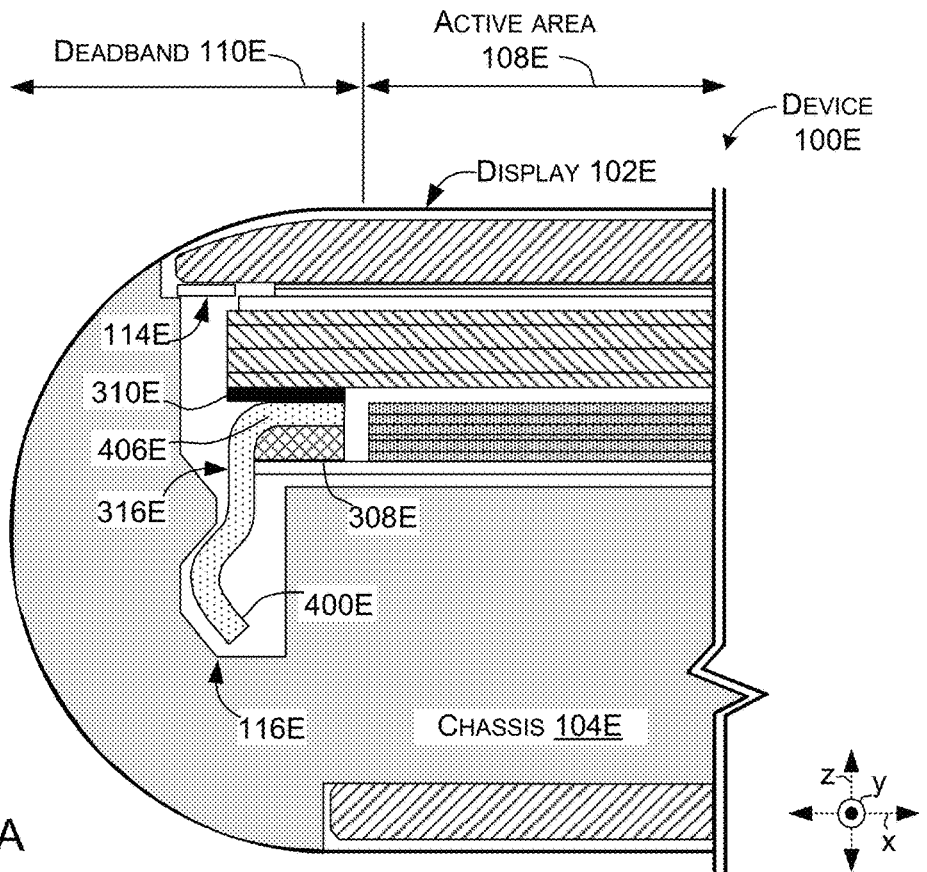
Figure 7B:
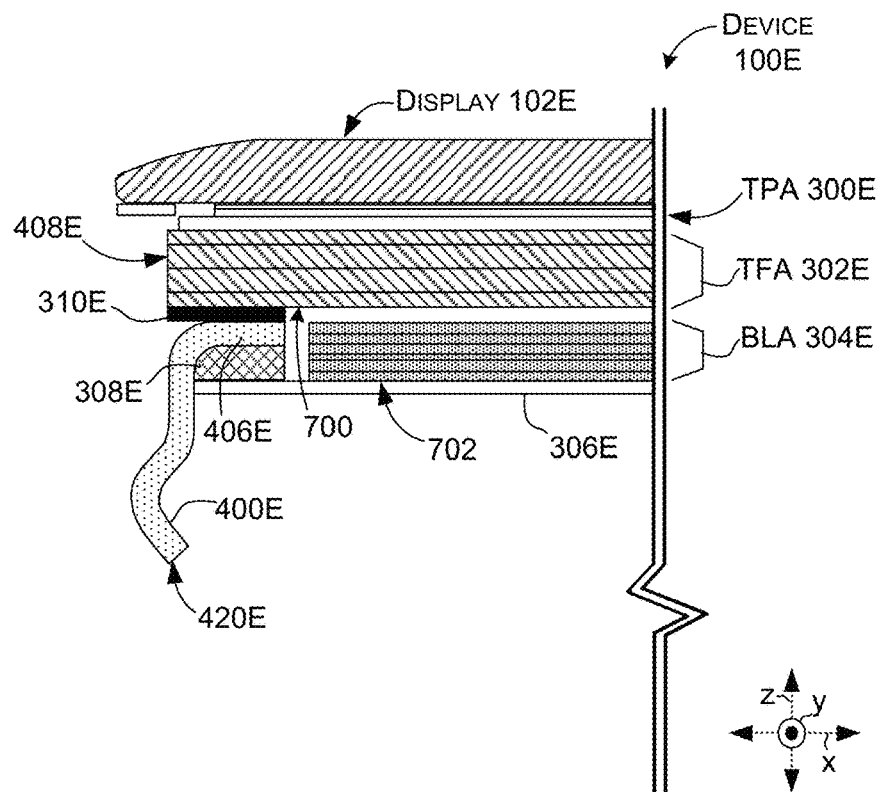

FIGS. 7A and 7B collectively show example device 100E, including display 102E, chassis 104E, and first and second stacked securing mechanisms 114E and 116E. In this example, bracket 400E of fastening assembly 316E features a different design than the brackets shown in the preceding examples. Bracket 400E can be viewed as an 'L-shaped' bracket, in contrast to the generally 'T-shaped' bracket 400 shown in FIGS. 4A-4C. In this case, bracket 400E can define a tab 406E, which can be formed by folding over an upper end of the bracket, for example. Here, bracket 400E is again the biasing element 420E.

In the example shown in FIGS. 7A and 7B, the tab 406E is secured to the display 102E between tape 310E and mold frame 308E. The tape can be secured to a lower surface (indicated at 700 in 7B) of the thin film assembly (TFA) 302E, and the mold frame can be secured to an upper surface (indicated at 702 in FIG. 7B) of back plate 306E. As such, the entire second stacked securing mechanism 116E can be contained below (in the z-reference direction) the thin film assembly 302E in this case. Since the bracket 400E does not extend upwards alongside the outer edge 408E of the thin film assembly in this example, this design may offer a reduced amount of deadband 110E compared to other designs.

Figure 8A:
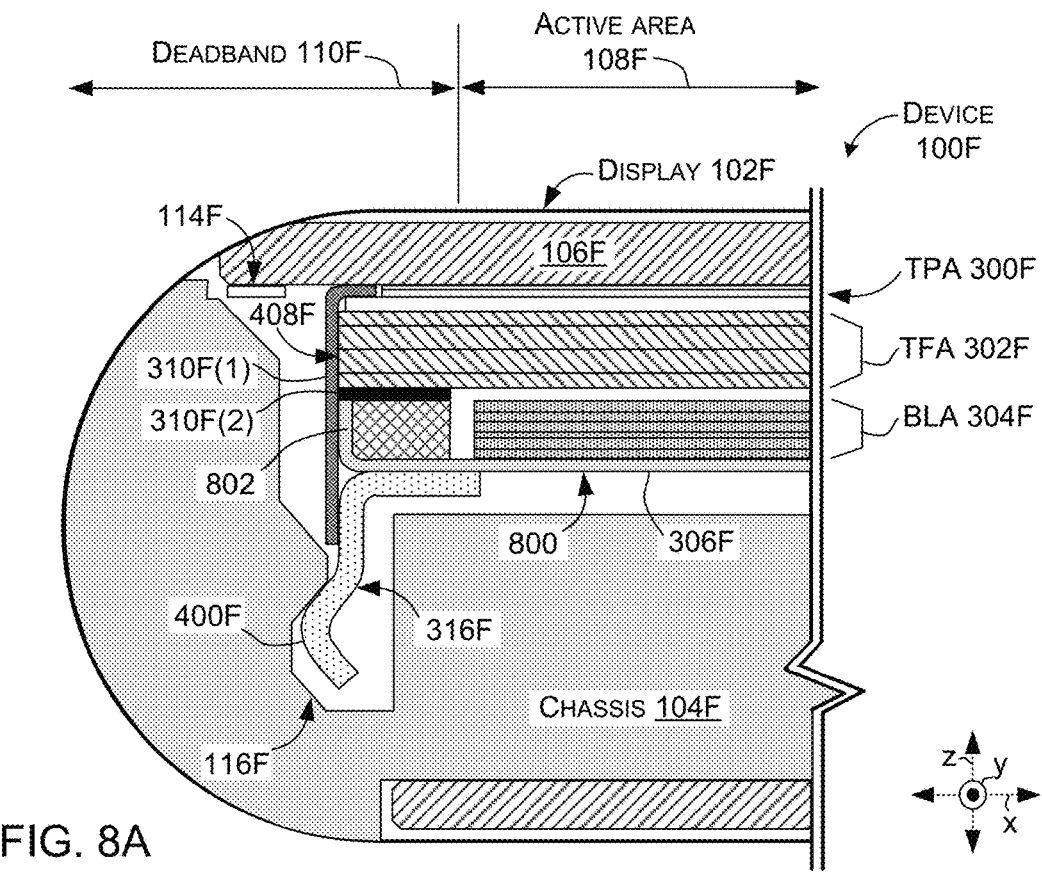
Figure 8B:
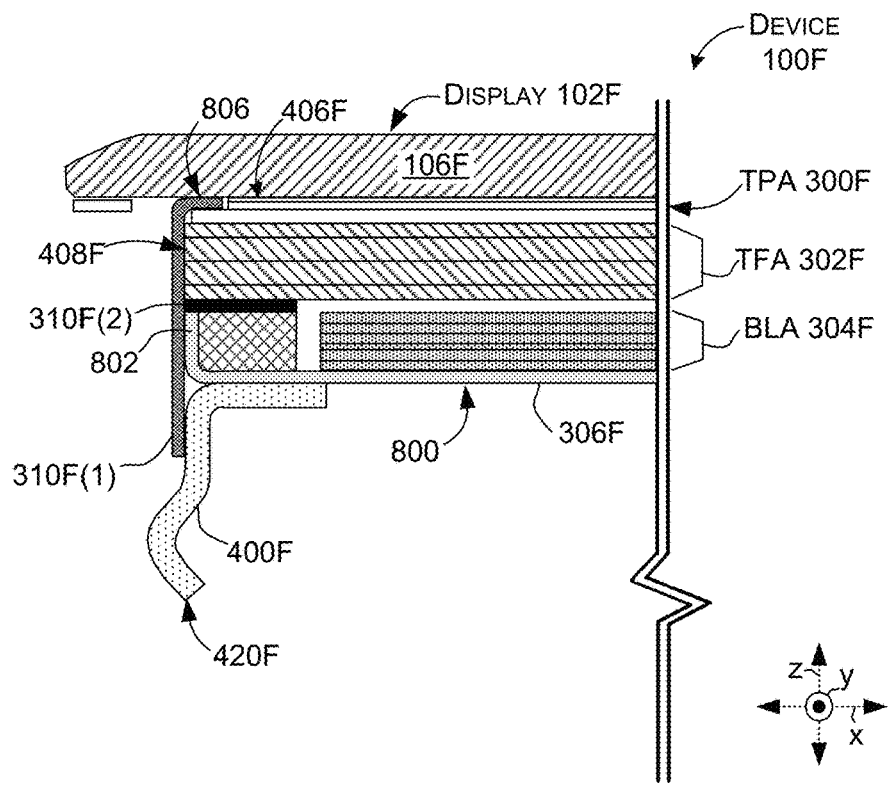

FIGS. 8A and 8B collectively show example device 100F, including display 102F, chassis 104F, and first and second stacked securing mechanisms 114F and 116F. In this example, second stacked securing mechanism 116F can include fastening assembly 316F. Fastening assembly 316F can include bracket 400F, which can be the biasing element 420F. In this example, two portions of tape 310F(1) and 310F(2) are shown. The bracket can be secured to a lower surface (indicated at 800) of back plate 306F, such as by welding. Tape 310F(1) can be oriented vertically along the bracket 400F, an upturned end 802 of the back plate 306F, and the outer edge 408F of the thin film assembly (TFA) 302F, for example. Tape 310F(1) can also have a horizontal portion (indicated at 806 in FIG. 8B), that can be secured to the lower surface 406F of the display protective layer 106F. In this case, the entire second stacked securing mechanism 116F can be positioned below (in the z-reference direction) the backlight assembly 304F. Since the bracket 400F does not extend upwards along the outer edge 408F of the backlight assembly and/or is contained below the back plate 306F, this design may offer a reduced amount of deadband 110F compared to other designs.

Figure 9A:
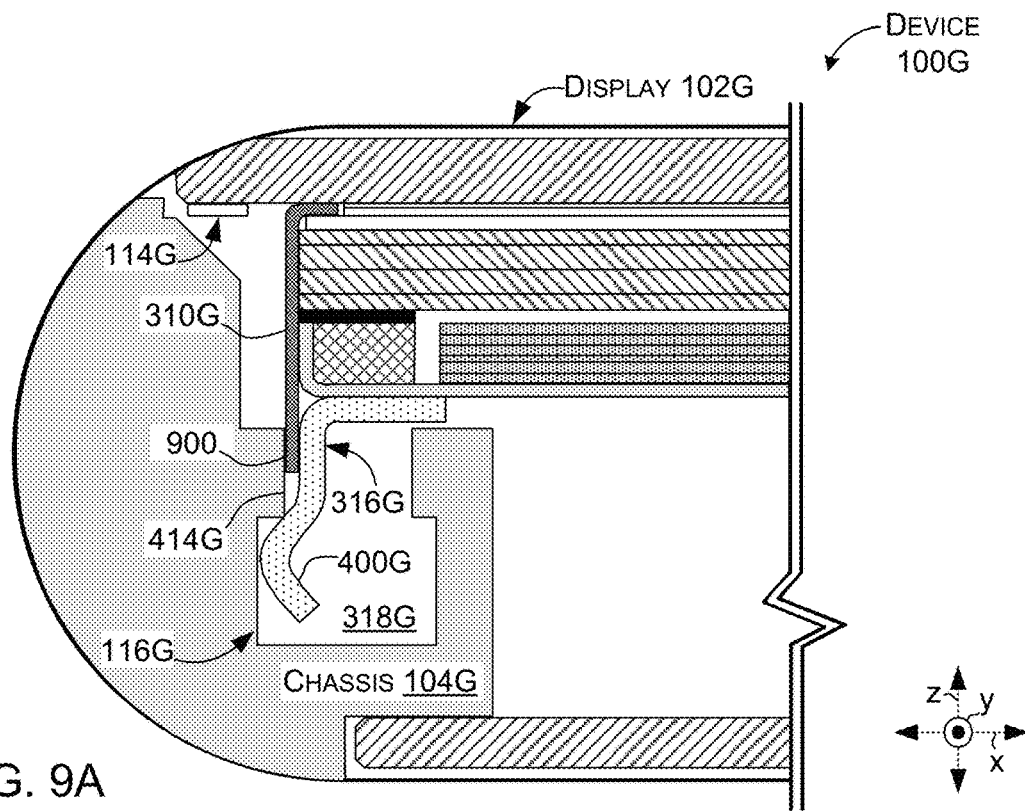
Figure 9B:
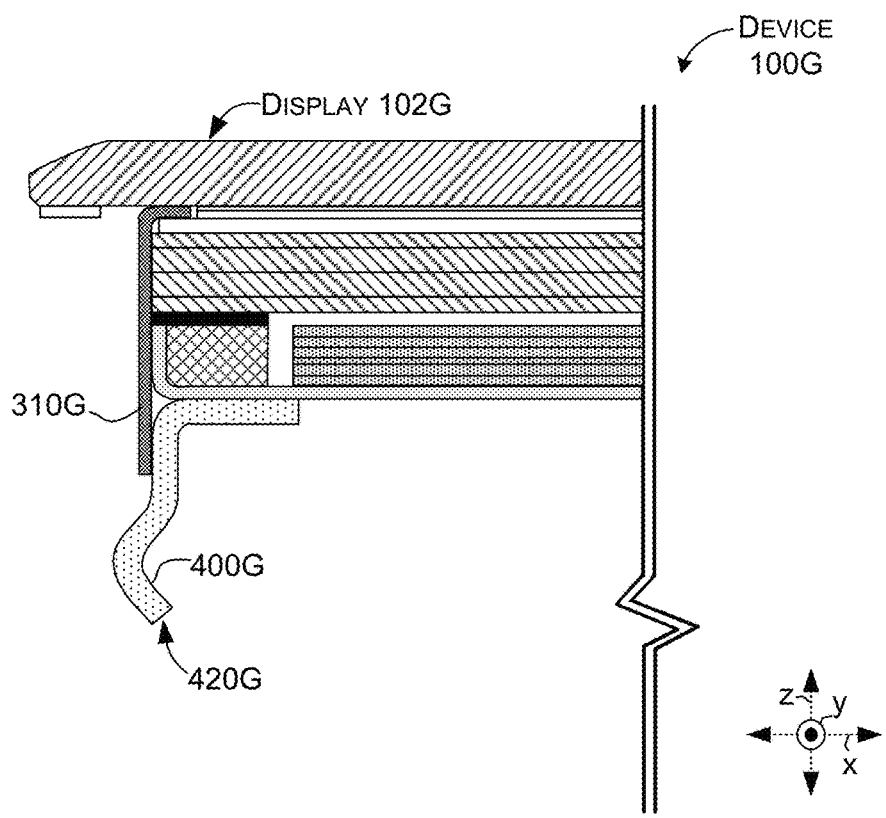

FIGS. 9A and 9B collectively show example device 100G, including display 102G, chassis 104G, and first and second stacked securing mechanisms 114G and 116G. In this example, second stacked securing mechanism 116G can include fastening assembly 316G, which can be analogous to fastening assembly 316F (FIGS. 8A and 8B). Here again, the bracket 400G is the biasing element 420G. However, in this example the chassis 104G, including cavity 318G, can have a similar shape to chassis 104D (FIG. 6A). As shown in FIG. 9A, in this case a lower end (indicated at 900) of tape 310G can extend downward and be secured between protuberance 414G and bracket 400G. In some implementations, geometry differences of the chassis and/or cavity may correspond to decreased deadband, and/or other design advantages and/or purposes.

Figure 10A:
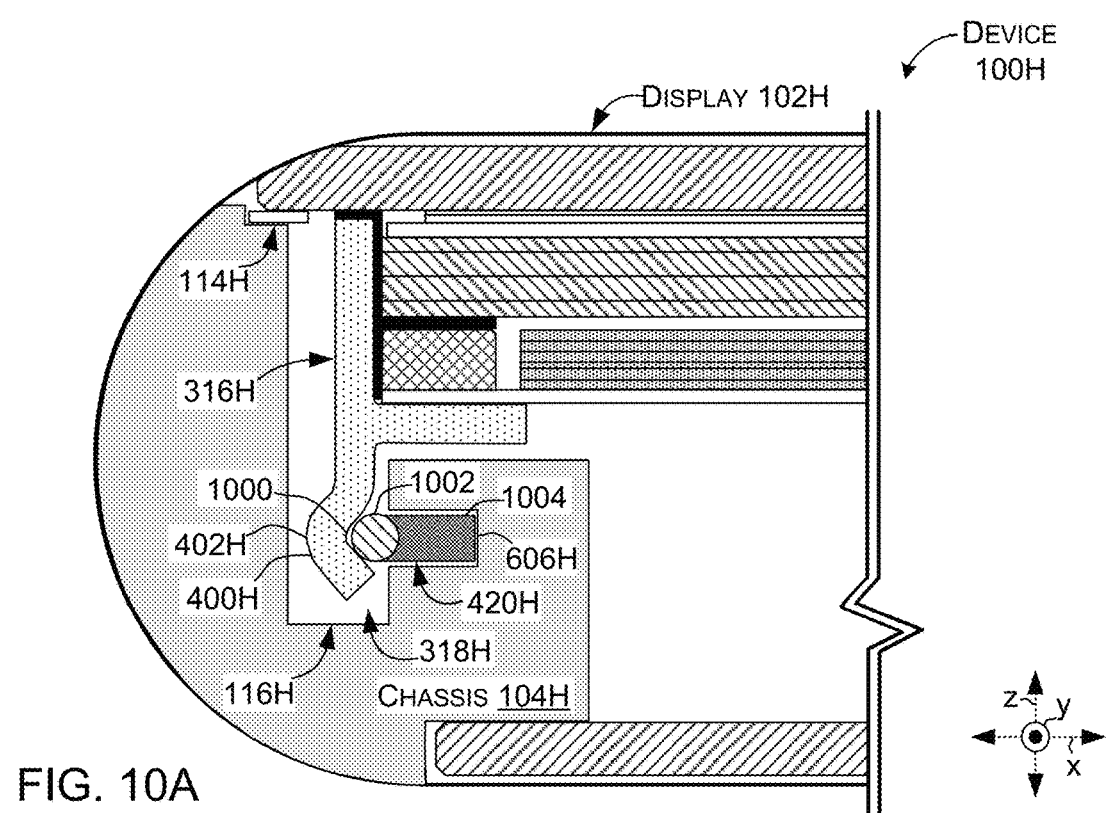
Figure 10B:
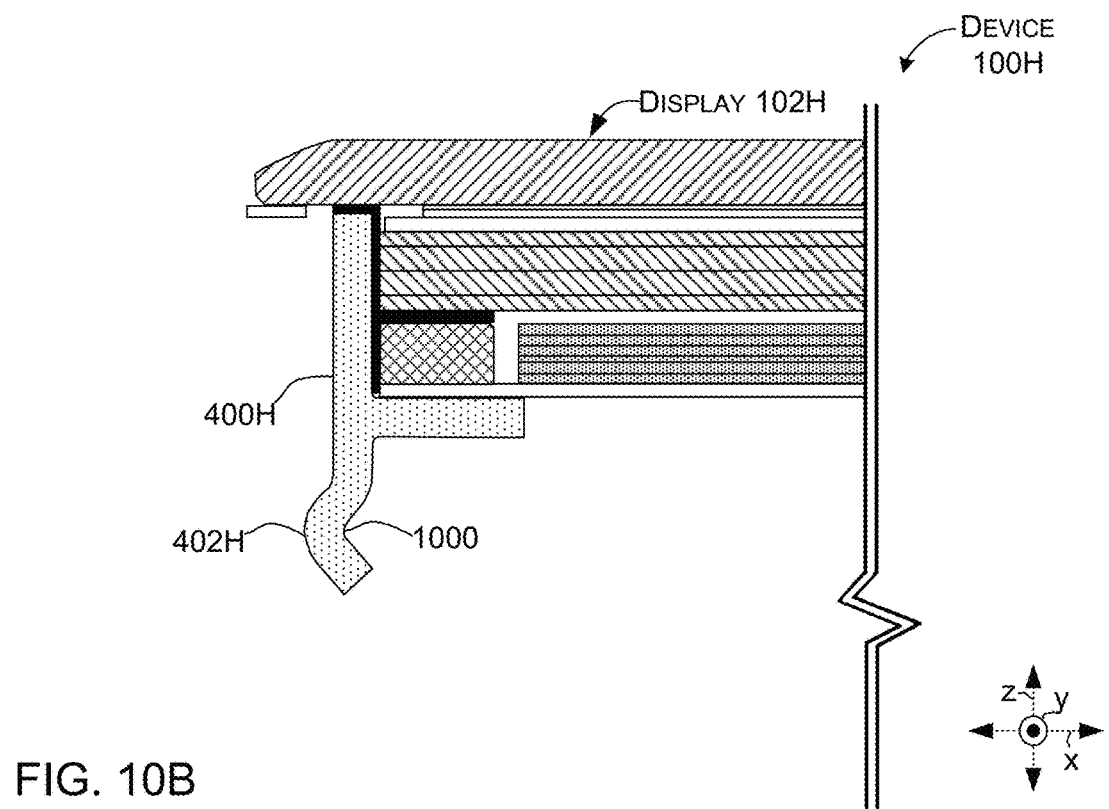

As introduced above, FIGS. 10A-11B show example devices that include a fastening assembly with a bracket secured to the display and a separate biasing element secured to the chassis. FIGS. 10A and 10B collectively show example device 100H, including display 102H, chassis 104H, and first and second stacked securing mechanisms 114H and 116H. In this example, second stacked securing mechanism 116H can include fastening assembly 316H. Fastening assembly 316H can include bracket 400H and biasing element 420H. Since the bracket 400H is not the biasing element 420H in this example, the bracket can be formed from a relatively stiff material compared to preceding examples. The bracket can be a magnesium thixomolded bracket, for example. In other implementations, the bracket can be formed from stainless steel, or another suitable material. As illustrated in FIGS. 10A and 10B, bracket 400H can have a dimple 402H, and a crease 1000 opposite the dimple.

In this example, the biasing element 420H can be secured in recess 606H. The biasing element can be any of a variety of mechanisms with a spring-like quality that can be biased away from the recess, such as a spring plunger, ball detent, etc. In the example shown in FIG. 10A, the biasing element can be a spring plunger (e.g., ball detent mechanism), including a plunger 1002 and a spring 1004. In this example, the plunger 1002 can be forced in the crease 1000 of bracket 400H by the spring 1004 to create a retention force to secure the display to the chassis.

Figure 11A:
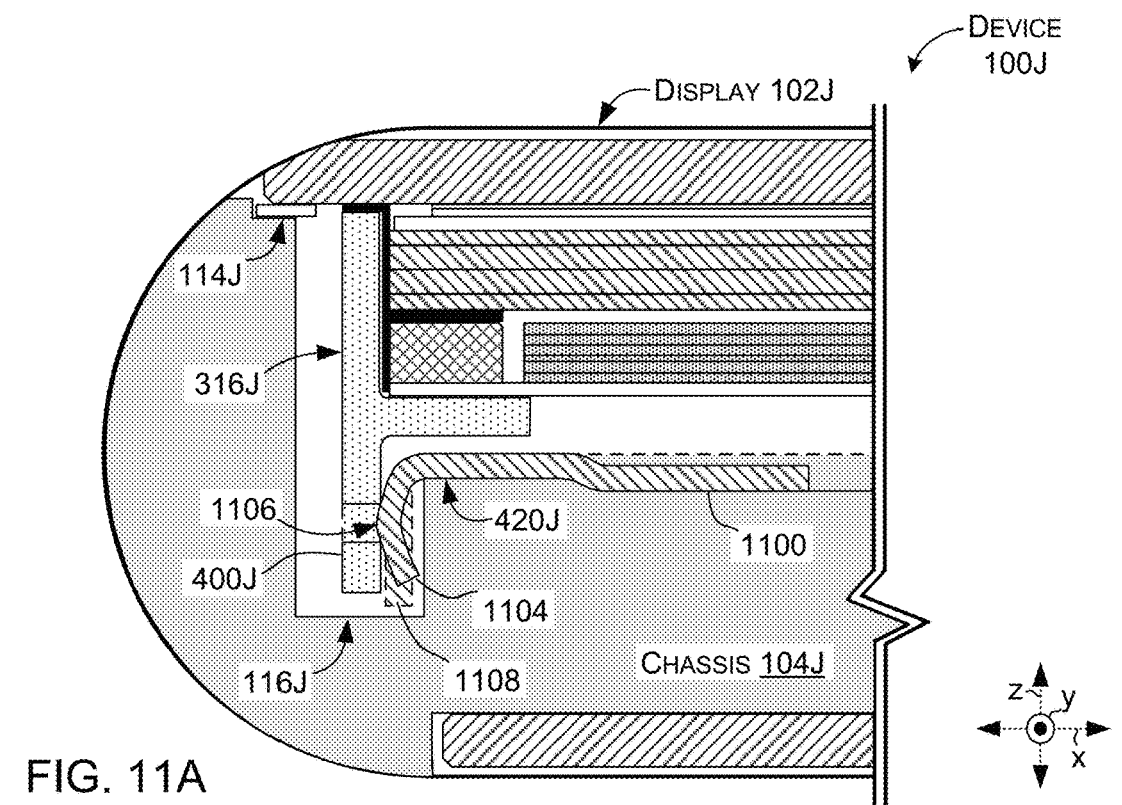
Figure 11B:
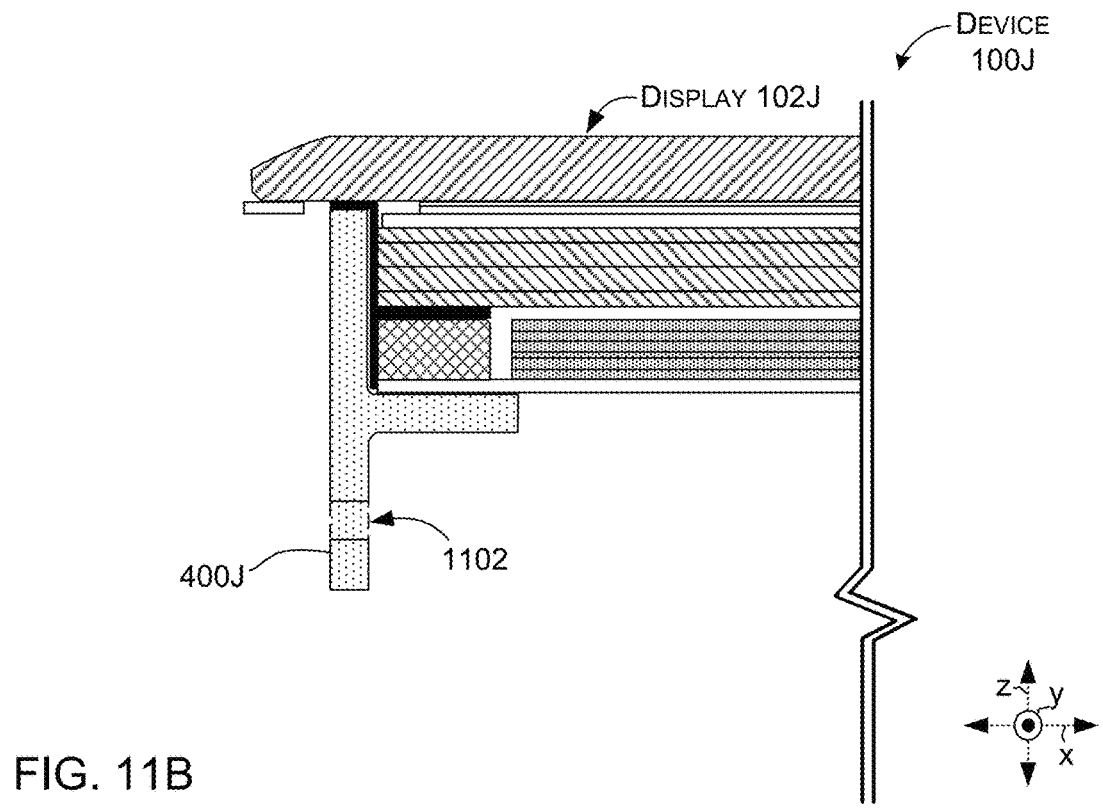

FIGS. 11A and 11B collectively show example device 100J, including display 102J, chassis 104J, and first and second stacked securing mechanisms 114J and 116J. Second stacked securing mechanism 116J includes fastening assembly 316J. Fastening assembly 316J can include bracket 400J and clip 1100. In this case, the clip 1100 can be the biasing element 420J of the second stacked securing mechanism. Bracket 400J can be formed from magnesium or another suitable material, and can have one or more holes passing through the bracket in the x-reference direction (indicated at 1102 in FIG. 11B). The clip 1100 can be secured to the chassis 104J, and can have one or more tabs (indicated at 1104 in FIG. 11A), which can be bent, stamped, or molded to form a dimple (indicated at 1106). The clip 1100 can extend in and out of the drawing page along the y-reference axis on either side of the tab 1104, shown in dashed lines and indicated at 1108. In this case, the dimple 1106 of the clip 1100 can be biased into the hole 1102 in the bracket 400J to create a retention force to secure the display to the chassis.

As noted above, in the examples shown in FIGS. 10A and 11A, the biasing elements 420H and 420J (e.g., plunger 1002 and spring 1004, clip 1100) of the second stacked securing mechanisms are located on a chassis-side rather than a display-side of the respective devices. For instance, in FIG. 10A, the plunger 1002 can be pushed aside into recess 606H as the bracket 400H is forced downward into the cavity 318H of chassis 104H, then the spring 1004 can cause the plunger 1002 to spring into the crease 1000 to retain the display 102H in the chassis. In FIG. 11A, the clip 1100 can be formed from a spring material and can flex when the bracket 400J is pressed downward into the chassis 104J, until the dimple 1106 of the clip 1100 rebounds into the hole 1102 to retain the display 102J in the chassis. In some implementations, having the biasing element located on the chassis-side rather than a display-side may correspond to decreased deadband, and/or other design advantages and/or purposes.

Figure 12A:
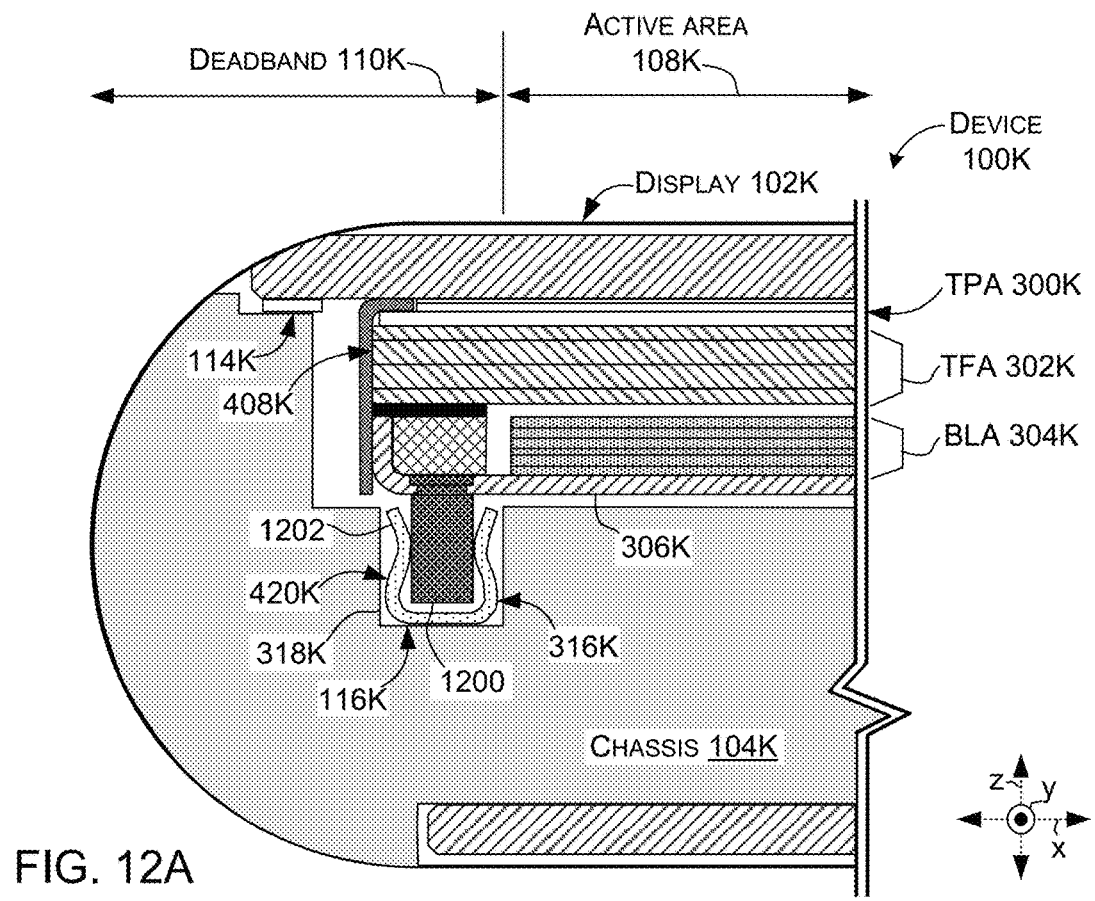
Figure 12B:
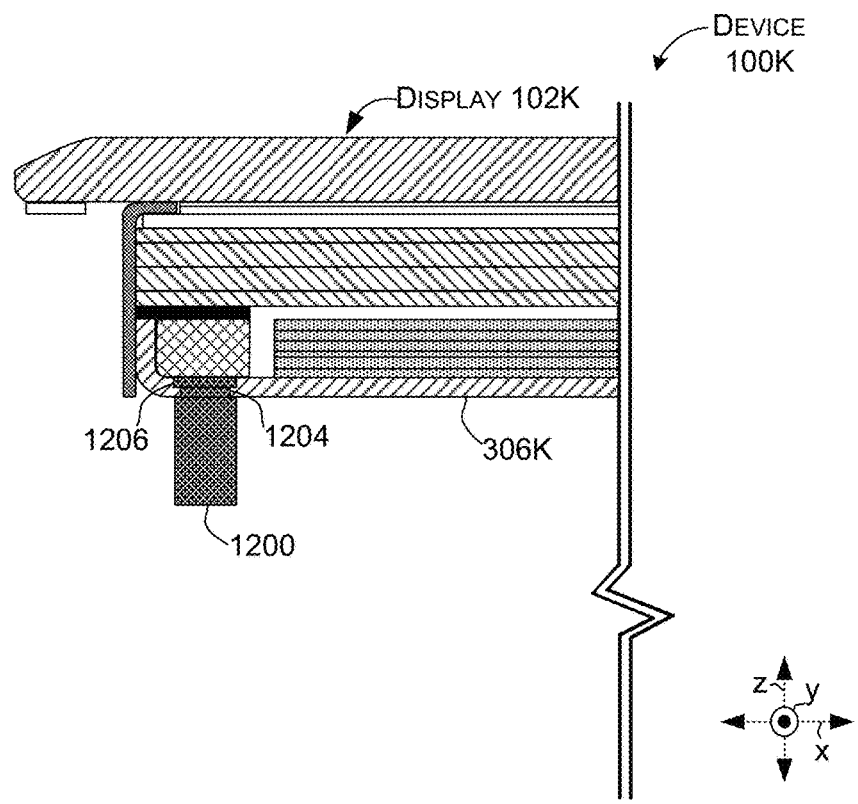

As introduced above, FIGS. 12A-13B show example devices that include a fastening assembly with a pin secured to the display and a separate biasing element secured to the chassis. FIGS. 12A and 12B collectively show example device 100K, including display 102K, chassis 104K, and first and second stacked securing mechanisms 114K and 116K. In this example, second stacked securing mechanism 116K can include fastening assembly 316K, which can be manifest as a pin 1200 and a spring 1202. The spring 1202 can be the biasing element 420K. The pin 1200 can include a neck 1204 and a head 1206. The pin can be welded to and/or fixed through the back plate 306K.

Device 100K provides another example where the biasing element is located on the chassis-side rather than the display-side of the device. In this case, the spring 1202 can be retained in cavity 318K, which is upwardly-facing and underlies the deadband 110K. The pin 1200 protrudes vertically downward (e.g., in the z-reference direction). When assembled, the pin 1200 is retained in the cavity 318K by the spring 1202 to secure the display 102K to the chassis 104K. Note that in this case, the second stacked securing mechanism 116K is contained within the outer edge 408K of the thin film assembly (TFA) 302K (toward an interior of display 102K along the x-reference direction). This arrangement, with the second stacked securing mechanism 116K tucked under the thin film assembly 302K, can help to reduce the deadband 110K of the device.

Figure 13A:
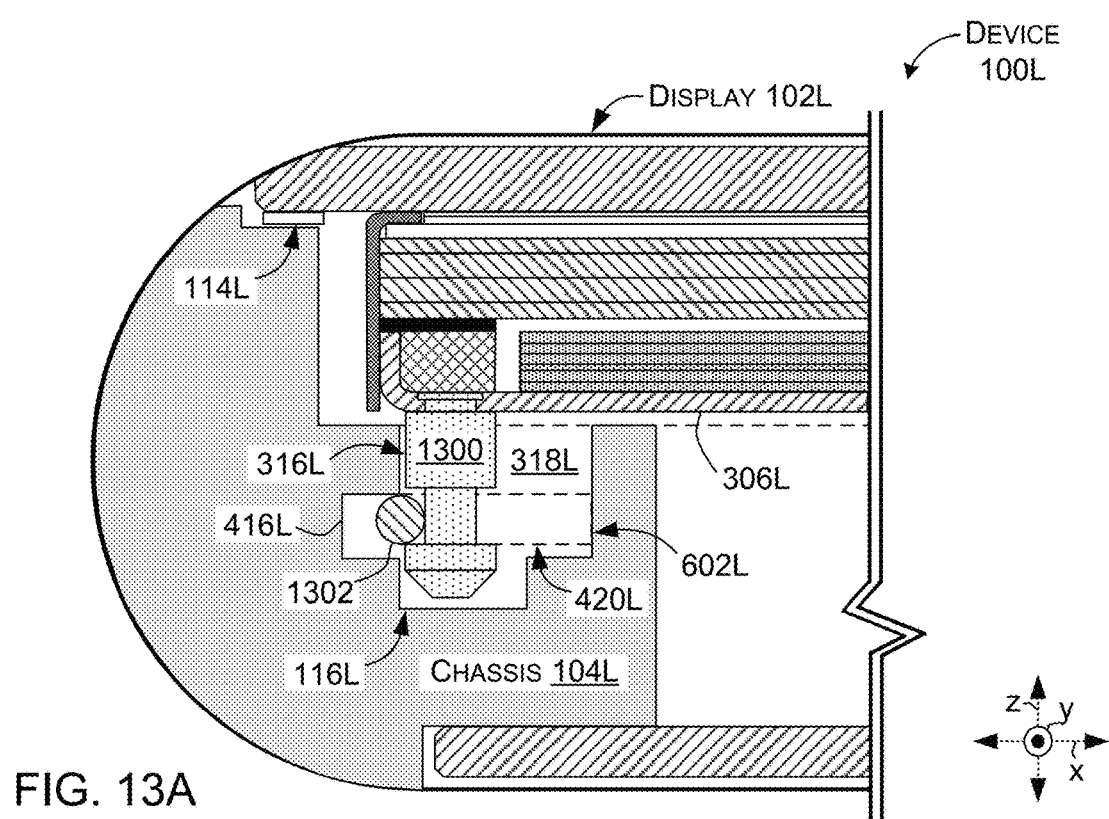
Figure 13B:
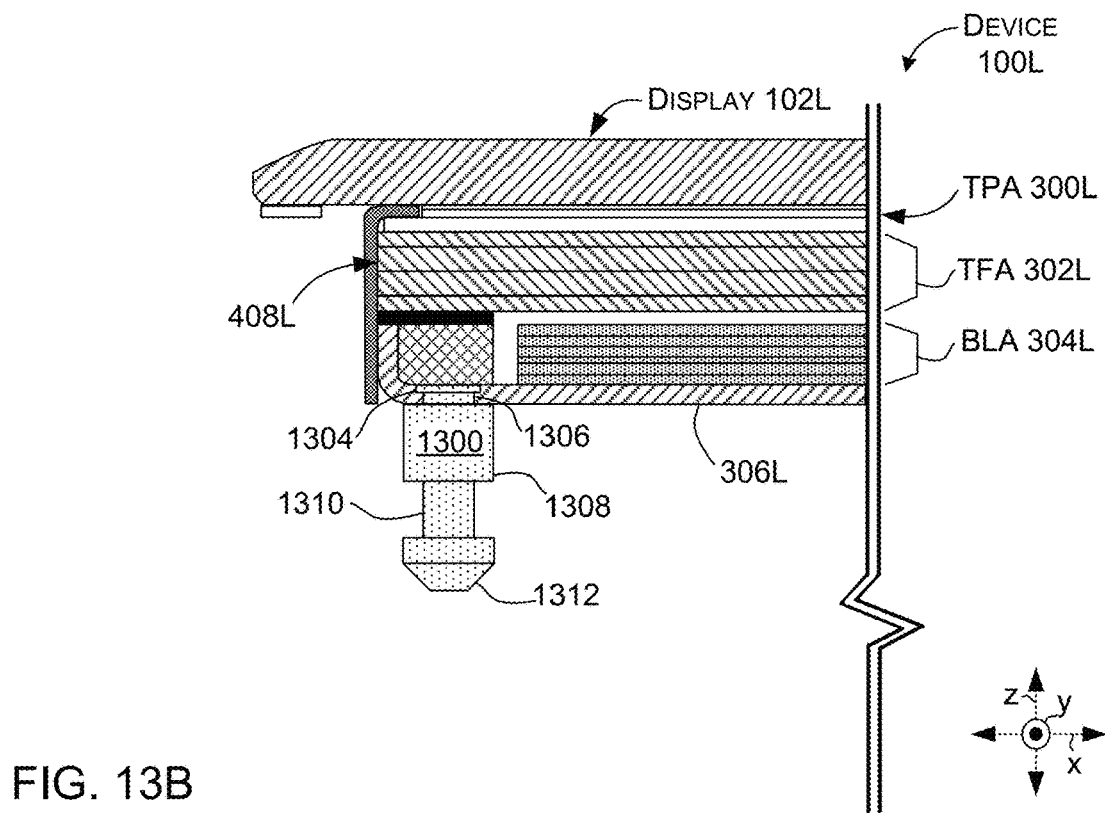
Figure 14A:
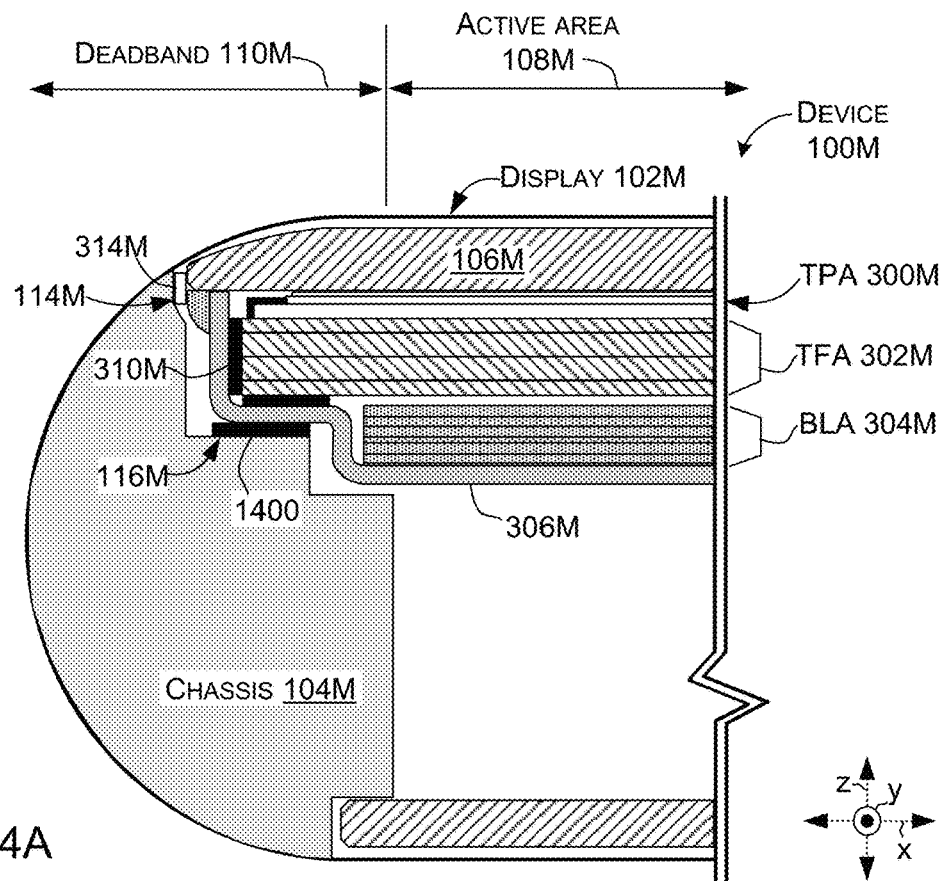
Figure 14B:
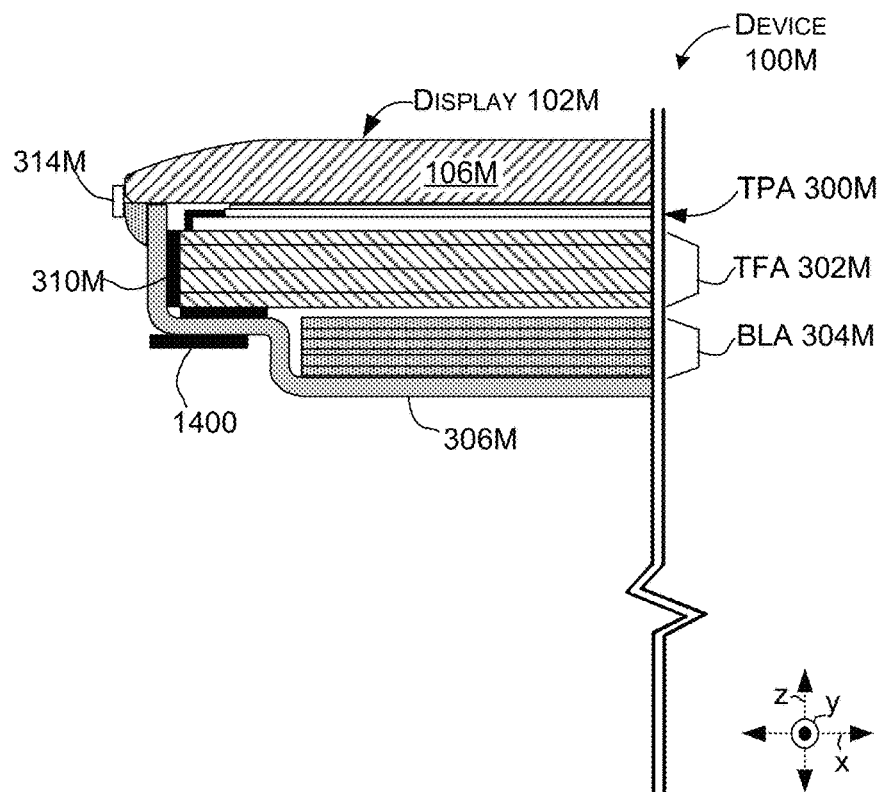

FIGS. 13A and 13B collectively show example device 100L, including display 102L, chassis 104L, and first and second stacked securing mechanisms 114L and 116L. In this example, second stacked securing mechanism 116L can include fastening assembly 316L. Fastening assembly 316L can include a pin 1300 and a spring wire 1302. In this case, the spring wire 1302 can be the biasing element 420L. The pin 1300 can have an upper head 1304, an upper neck 1306, a body 1308, a narrow waist 1310, and a lower head 1312. The pin 1300 can be welded to and/or fixed through the back plate 306L. The spring wire 1302 can be secured to an interior wall 602L of cavity 318L in the chassis 104L. The spring wire can extend from the interior wall 602L across the cavity into recess 416L, as a loop for example. In this case, the lower head 1312 of the pin 1300 can be pushed downwardly through the loop of spring wire 1302, pushing the spring wire 1302 aside into recess 416L, until the spring wire 1302 rebounds into the narrow waist 1310, creating a retention force to secure the display to the chassis. Similar to example device 100K (FIGS. 12A and 12B), the second stacked securing mechanism 116L in this case is generally contained inside the outer edge 408L of the thin film assembly (TFA) 302L. Therefore, the design variation represented by device 100L may offer reduced deadband compared to other designs.

FIGS. 14A and 14B collectively show example device 100M, including display 102M, chassis 104M, and first and second stacked securing mechanisms 114M and 116M. First stacked securing mechanism 114M can be manifest as adhesive 314M, for instance. In this example, second stacked securing mechanism 116M can be manifest as adhesive 1400, rather than a fastening assembly as in the preceding examples. In this example, the adhesive 1400 secures the display to the chassis. For instance, pressure sensitive adhesive and/or double-sided tape can be employed. The adhesive can be applied continuously around the border of a device, or located in discrete sections, for example.

As illustrated in FIGS. 14A and 14B, the back plate 306M can be shaped to fit around the backlight assembly (BLA) 304M and also the thin film assembly (TFA) 302M, and can be secured to these assemblies with tape 310M. The shape of back plate 306M can support the thin film assembly, instead of a mold frame (e.g., mold frame 308 in FIG. 3), for instance. In this example, the first and second stacked securing mechanisms 114M and 116M are generally vertically aligned, with the first stacked securing mechanism 114M positioned closer to the display protective layer 106M and the second stacked securing mechanism 116M positioned further below (in the z-reference direction), under the thin film assembly 302M. Thus, this example can allow for a narrower deadband 110M than traditional techniques, in accordance with stacked securing concepts.

Various examples of stacked securing mechanisms are described above relative to FIGS. 4A through 14B. To some extent, the features shown in FIGS. 4A through 14B can be considered interchangeable. For instance, a particular shape of a bracket, inclusion of edge fill, geometry of a display-chassis interface, and/or arrangement of adhesive and/or tape from one FIG. may be combined with a cavity shape, access port, and/or biasing element from another FIG. Stated another way, rather than an exhaustive presentation of every combination of the example stacked securing mechanisms described herein, descriptions of elements have been provided relative to at least one example device, in combination with various other example elements. The examples shown and described herein are not meant to be limiting; additional variations are contemplated.

In general, the examples of fastening assemblies and/or biasing elements presented herein can contribute to more serviceable devices than existing designs. For instance, with existing designs, trying to separate the display from the chassis can damage the device. In contrast, the present implementations lend themselves to easy assembly due to the self-aligning nature of the fastening assembly. The present implementations also lend themselves to easy, damage-free disassembly. For disassembly, forces could be applied to the biasing element to temporarily overcome the spring and/or retention force imparted by the fastening assemblies and/or biasing elements. The display can then be readily removed from the chassis. Once repairs and/or other maintenance are completed, the display can be readily reinstalled in the chassis. Various methods may be used to overcome these forces, including a greater force and/or leverage. In some implementations, the device could include an access port (e.g., tunnel) through which a small pin or rod could be inserted to apply the temporary force to release a fastening assembly and/or biasing element for disassembly.

The present stacked securing concepts can be utilized with various types of devices, such as computing devices that can include, but are not limited to, notebook computers, tablet computers, smart phones, wearable smart devices (e.g. smart watches), headphones, gaming devices, entertainment consoles, home and enterprise appliances, automobiles, machinery, and/or other developing or yet to be developed types of devices. As used herein, a computing device can be any type of device that has some amount of processing and/or storage capacity.

From one perspective in some implementations, a display can be secured to the chassis of a device using stacked securing concepts. In some cases, stacked securing mechanisms can include adhesive and/or tape. In other cases, stacked securing mechanisms can be manifest as a fastening assembly and/or biasing element that imparts a retention force between a display and a chassis. The stacked securing mechanisms can be spaced apart from one another or continuously surround a border area of a device. The stacked securing mechanisms can reduce deadband compared to previous solutions, and thereby offer a relatively larger and/or more extensive active area for a display. Thus, the present implementations can provide superior display devices with narrower deadband as compared to traditional techniques.

Various examples are described above. Additional examples are described below. One example includes a device comprising a display having an active area surrounded by an inactive deadband, where the active area and the inactive deadband lie in a plane. The device can also include a chassis, the display received in the chassis and secured to the chassis beneath the inactive deadband with adhesive and a fastening assembly positioned below the inactive deadband and farther beneath the plane than the adhesive. The fastening assembly can comprise a bracket that creates a retention force between the display and the chassis.

Another example can include any of the above and/or below examples where the chassis comprises a housing or wherein the chassis is positioned in a housing of the device.

Another example can include any of the above and/or below examples where the fastening assembly is stacked vertically below the adhesive.

Another example can include any of the above and/or below examples where the display comprises a display protective layer that extends along the plane and the adhesive extends between the display protective layer and the chassis.

Another example can include any of the above and/or below examples where the bracket comprises a biasing element that imparts a retention force that can be overcome to assemble or disassemble the display from the chassis.

Another example can include any of the above and/or below examples where the biasing element comprises a spring.

Another example can include any of the above and/or below examples where the fastening assembly comprises multiple fastening assemblies that are spaced apart from one another.

Another example can include any of the above and/or below examples where the bracket defines a dimple that is received in a recess defined by the chassis.

Another example can include any of the above and/or below examples where the device comprises a foldable computing device, a tablet, a smart phone, or a smart watch.

Another example includes a device comprising a display comprising a display protective layer and a back plate, the display protective layer including an active area surrounded by a deadband; a chassis defining a cavity located below the back plate and below the deadband; and a fastening assembly comprising a biasing element. The biasing element can create a retention force between the chassis and the display to retain the display in the chassis.

Another example can include any of the above and/or below examples where the biasing element is secured to the chassis, and wherein the fastening assembly further comprises a bracket secured to the display and the biasing element comprises a spring that biases a plunger against the bracket to retain the fastening assembly in the cavity.

Another example can include any of the above and/or below examples where the biasing element is secured to the chassis, and wherein the fastening assembly further comprises a pin secured to the display and the biasing element interacts with the pin to retain the fastening assembly in the cavity.

Another example can include any of the above and/or below examples where the pin defines a narrow waist, and the biasing element comprises a spring wire which retains the pin in the cavity via the narrow waist of the pin.

Another example can include any of the above and/or below examples further comprising adhesive at a display-chassis interface below the deadband.

Another example can include any of the above and/or below examples where the biasing element is secured to the display.

Another example includes a device comprising a display and a chassis. The display can have an active area surrounded by an inactive deadband. The display can be received in the chassis. The example can include first and second stacked securing mechanisms positioned beneath the inactive deadband that secure the display to the chassis. The second stacked securing mechanism can comprise a biasing element that creates a retention force between the display and the chassis.

Another example can include any of the above and/or below examples where the first stacked securing mechanism is an adhesive and the second stacked securing mechanism comprises a bracket that includes the biasing element that imparts the retention force between the display and the chassis.

Another example can include any of the above and/or below examples where the biasing element is biased from the display and against the chassis.

Another example can include any of the above and/or below examples where the second stacked securing mechanism comprises a bracket that is separate from the biasing element and interacts with the biasing element to create the retention force.

Another example can include any of the above and/or below examples where the second stacked securing mechanism comprises a pin that is secured to the display and is engaged by the biasing element that is located on the chassis.

CONCLUSION

Although techniques, methods, devices, systems, etc., pertaining to stacked securing concepts for securing displays and chassis are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
a display comprising a display protective layer and a plurality of display components, the display having an active area surrounded by an inactive deadband, where the active area and the inactive deadband lie in a plane;
a chassis, the display received in the chassis and secured to the chassis beneath the inactive deadband with adhesive; and
a fastening assembly extending into a cavity inside the chassis, the fastening assembly being positioned below the inactive deadband and farther beneath the plane than the adhesive, and further being secured to and laterally adjacent to the plurality of display components, the fastening assembly comprising a bracket that creates a retention force between the display and the chassis.

2. The device of claim 1, wherein the chassis comprises a housing or wherein the chassis is positioned in a housing of the device.

3. The device of claim 1, wherein the fastening assembly is stacked vertically below the adhesive.

4. The device of claim 1, wherein the display protective layer extends along the plane and the adhesive extends between the display protective layer and the chassis.

5. The device of claim 1, wherein the bracket comprises a biasing element that imparts a retention force that can be overcome to assemble or disassemble the display from the chassis.

6. The device of claim 5, wherein the biasing element comprises a spring.

7. The device of claim 1, wherein the fastening assembly comprises multiple fastening assemblies that are spaced apart from one another.

8. The device of claim 1, wherein the bracket defines a dimple that is received in a recess defined by the chassis.

9. The device of claim 1, wherein the device comprises a foldable computing device, a tablet, a smart phone, or a smart watch.

10. A device, comprising:
a display comprising a display protective layer, a plurality of display components, and a back plate, the display protective layer including an active area surrounded by a deadband;
a chassis defining a cavity located below the back plate and below the deadband; and
a fastening assembly extending into the cavity and laterally adjacent to the plurality of display components, the fastening assembly comprising a biasing element, where the biasing element creates a retention force between the chassis and the display to retain the display in the chassis.

11. The device of claim 10, wherein the biasing element is secured to the chassis, and wherein the fastening assembly further comprises a bracket secured to the display and the biasing element comprises a spring that biases a plunger against the bracket to retain the fastening assembly in the cavity.

12. The device of claim 10, wherein the biasing element is secured to the chassis, and wherein the fastening assembly further comprises a pin secured to the display and the biasing element interacts with the pin to retain the fastening assembly in the cavity.

13. The device of claim 12, wherein the pin defines a narrow waist, and the biasing element comprises a spring wire which retains the pin in the cavity via the narrow waist of the pin.

14. The device of claim 10, further comprising adhesive at a display-chassis interface below the deadband.

15. The device of claim 10, wherein the biasing element is secured to the display.

16. A device, comprising:
a display comprising a display protective layer and a plurality of display components, the display having an active area surrounded by an inactive deadband;
a chassis, the display received in the chassis; and
first and second stacked securing mechanisms positioned beneath the inactive dead band that secure the display to the chassis, the second stacked securing mechanism being positioned laterally adjacent to the plurality of display components and comprising a biasing element that creates a retention force between the display and the chassis.

17. The device of claim 16, wherein the first stacked securing mechanism is an adhesive and the second stacked securing mechanism comprises a bracket that includes the biasing element that imparts the retention force between the display and the chassis.

18. The device of claim 17, wherein the biasing element is biased from the display and against the chassis.

19. The device of claim 16, wherein the second stacked securing mechanism comprises a bracket that is separate from the biasing element and interacts with the biasing element to create the retention force.

20. The device of claim 16, wherein the second stacked securing mechanism comprises a pin that is secured to the display and is engaged by the biasing element that is located on the chassis.

* * * * *